United States Patent
Imagawa et al.

(10) Patent No.: US 6,279,396 B1
(45) Date of Patent: Aug. 28, 2001

(54) ULTRASONIC-WAVE DISTANCE MEASURING METHOD AND APPARATUS OF SEPARATE TRANSMISSION AND RECEPTION TYPE REFLECTION SYSTEM

(75) Inventors: Toshiyuki Imagawa, Saitama; Junichi Toyoda; Tatsuo Hakuta, both of Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/288,638

(22) Filed: Apr. 9, 1999

(30) Foreign Application Priority Data

Apr. 15, 1998 (JP) .................................................. 10-104812

(51) Int. Cl.$^7$ ...................................................... G01H 5/00
(52) U.S. Cl. ............................................. 73/597; 73/1.79
(58) Field of Search ........................... 73/597, 599, 628, 73/627, 488, 489, 490, 1.37, 1.79, 861.27; 367/89, 99, 141

(56) References Cited

U.S. PATENT DOCUMENTS

| | | | |
|---|---|---|---|
| 4,515,021 | * | 5/1985 | Wallace et al. ................... 73/861.27 |
| 4,541,279 | * | 9/1985 | Schomberg ............................ 73/597 |
| 4,762,001 | * | 8/1988 | Wuttke .................................... 73/597 |
| 4,800,757 | * | 1/1989 | Hashinoki et al. ..................... 73/597 |
| 4,976,149 | * | 12/1990 | Ichikawa et al. ...................... 73/597 |
| 5,419,331 | * | 5/1995 | Parker et al. ..................... 128/661.08 |
| 5,549,001 | * | 8/1996 | Brokowski et al. .................... 73/597 |
| 5,557,047 | * | 9/1996 | Koide ..................................... 73/597 |
| 5,918,281 | * | 6/1999 | Nabulsi ................................... 73/587 |
| 6,009,380 | * | 12/1999 | Vecchio et al. ....................... 702/142 |

* cited by examiner

Primary Examiner—Richard A. Moller
(74) Attorney, Agent, or Firm—Ronald P. Kananen; Rader, Fishman & Grauer

(57) ABSTRACT

An ultrasonic-wave distance measuring apparatus of the separate transmission and reception type reflection system capable of making the measurable distance longer and improving the precision of the measuring, wherein a distance measurement calculation control circuit in an ultrasonic-wave transmitter starts counting a time simultaneously with the start of vibration of an ultrasonic-wave transmission sensor, the ultrasonic-wave emitted from the ultrasonic-wave transmission sensor is reflected at the object to be measured and detected by an ultrasonic-wave reception sensor, a distance measurement sensitivity correction circuit corrects the sensitivity of the signal from the ultrasonic-wave reception sensor based on sensitivity correction data predetermined in accordance with a type of object and a measurement distance, the signal after the sensitivity correction by the distance measurement sensitivity correction circuit is detected in a detection circuit, and the distance measurement calculation control circuit stops counting when the detection signal exceeds a predetermined level, measures the time from the start of vibration of the ultrasonic-wave transmission sensor to the reception by the ultrasonic-wave reception sensor, and calculates the distance between the object to be measured and the ultrasonic-wave transmission sensor based on the obtained time.

11 Claims, 9 Drawing Sheets

TRANSMISSION/RECEPTION SEPARATION
TYPE REFLECTION SYSTEM

AGC CHARACTERISTIC

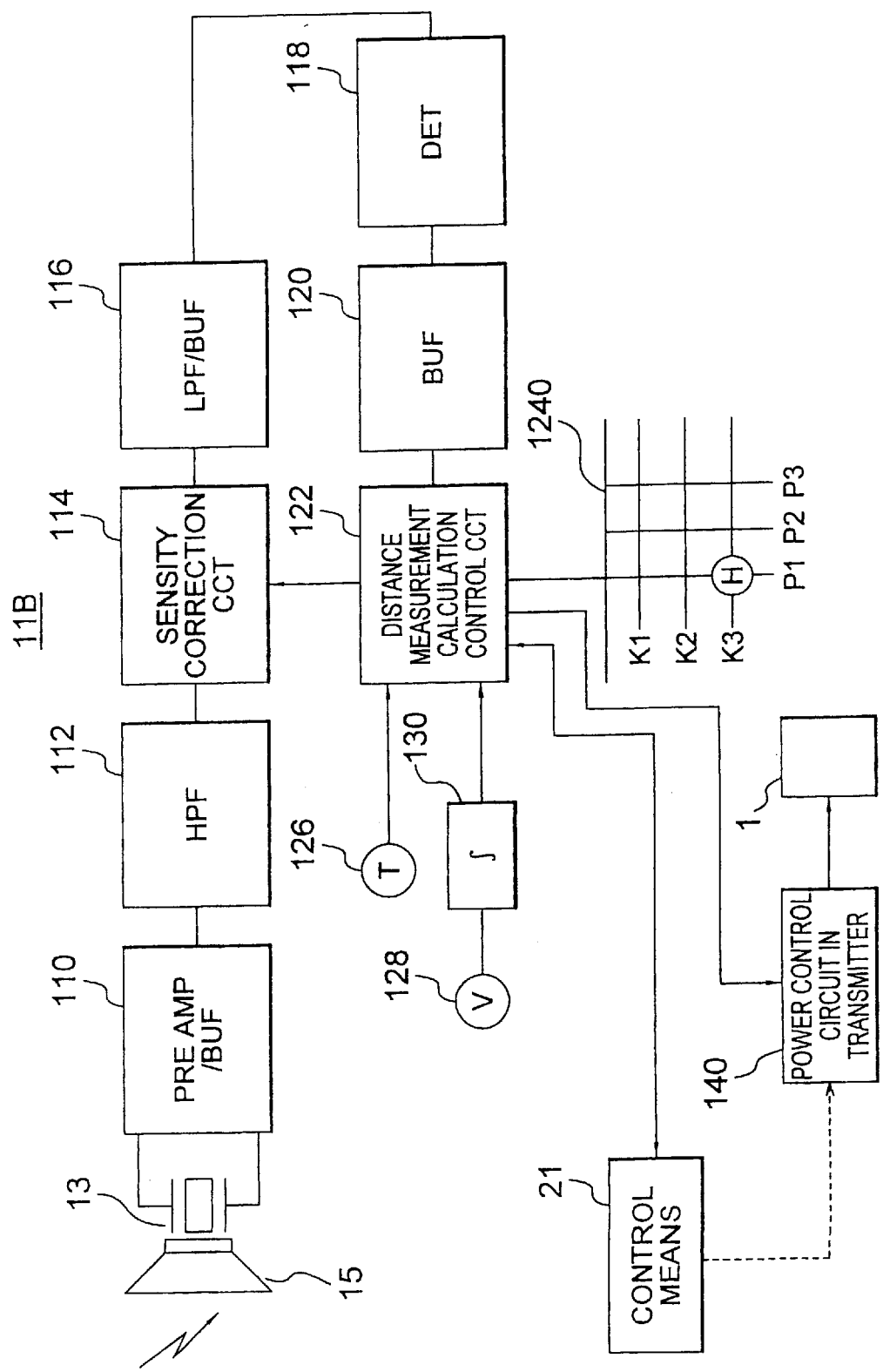

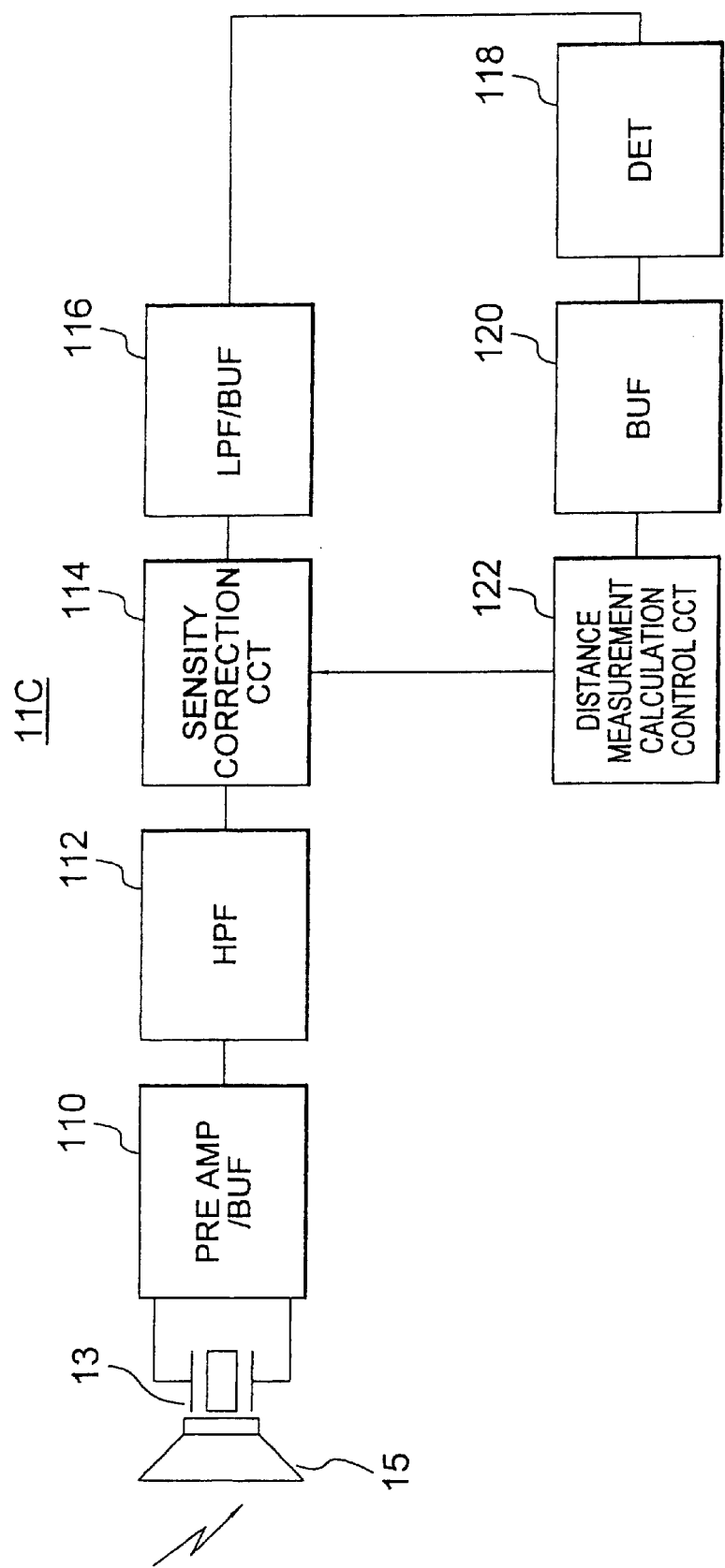

ULTRASONIC-WAVE DISTANCE MEASURING METHOD AND APPARATUS OF SEPARATE TRANSMISSION AND RECEPTION TYPE REFLECTION SYSTEM

BACKGROUND OF THE INVENTION

1. Field of the Invention

The present invention relates to a method of measuring distance using an ultrasonic wave sensor and an apparatus therefor, more specifically, relates to a technique which enables measurement of a long distance by an ultrasonic-wave distance measuring method and an apparatus of the separate transmission and reception type reflection system which measure a distance using two water-proof ultrasonic-wave sensors.

2. Description of the Related Art

Distance measuring methods using ultrasonic-wave sensors are known.

These systems for measuring distance using ultrasonic-wave sensors may be roughly divided into two groups: distance measuring apparatuses of a single-sensor system which use a single ultrasonic-wave sensor for both transmission and reception and distance measuring apparatuses of the separate transmission and reception type reflection system which independently use an ultrasonic-wave transmission sensor and an ultrasonic-wave reception sensor.

The distance measuring apparatuses of the single-sensor system are advantageous because the price of the ultrasonic-wave sensor becomes low since only one ultrasonic-wave sensor is used. However, since the ultrasonic-wave sensor is used for both transmission and reception, the circuit has to be switched at the transmission timings and reception timings and it is difficult to measure short distances in some cases.

An ultrasonic-wave distance measuring apparatus of the separate transmission and reception type reflection system is an ultrasonic-wave distance measuring apparatus of a dual-sensor system provided with an independent ultrasonic-wave transmission sensor and ultrasonic-wave reception sensor and overcomes the above disadvantage of the distance measuring apparatus of a single-sensor system.

The present invention relates to an ultrasonic-wave distance measuring apparatus of the separate transmission and reception type reflection system.

FIG. 1 is a view of the configuration of an ultrasonic-wave distance measuring apparatus of the separate transmission and reception type reflection system.

This ultrasonic-wave distance measuring apparatus of the separate transmission and reception type reflection system includes a transmission side having an ultrasonic-wave transmitter 1, an ultrasonic-wave transmission sensor 3, and a transmission horn antenna 5 and a reception side having an ultrasonic-wave receiver 11, an ultrasonic-wave reception sensor 13, and a reception horn antenna 15.

In this ultrasonic-wave distance measuring apparatus of the separate transmission and reception type reflection system, the transmission side and the reception side are installed in a certain apparatus, for example, a vehicle, and can be used for measuring a distance from the vehicle to a distance measured object 7. As an example of measuring distance, the detection of obstacles for vehicles can be mentioned.

The method of measuring a distance by the ultrasonic-wave distance measuring apparatus of the separate transmission and reception type reflection system shown in FIG. 1 will be described next.

The ultrasonic-wave transmitter 1 energizes the ultrasonic-wave transmission sensor 3 to make the ultrasonic-wave transmission sensor 3 generate an ultrasonic wave. The ultrasonic wave from the ultrasonic-wave transmission sensor 3 is directed to the distance measured object 7 via the transmission horn antenna 5 and strikes the distance measured object 7.

The ultrasonic wave reflected on the distance measured object 7 returns to the ultrasonic-wave reception sensor 13 via the reception horn antenna 15. The ultrasonic-wave reception sensor 13 outputs an electric signal in response to the level of the incident ultrasonic wave. The ultrasonic-wave receiver 11 measures the time from emission of the ultrasonic wave by the ultrasonic-wave transmission sensor 3 to reception of the same by the ultrasonic-wave reception sensor 13 and calculates the distance between the distance measured object 7 and the ultrasonic-wave transmission sensor 3 from the measured time.

In the ultrasonic-wave distance measuring apparatus of the separate transmission and reception type reflection system shown in FIG. 1, when used for a vehicle or the like, ultrasonic-wave sensors of a waterproof type are often used as the ultrasonic-wave transmission sensor 3 and the ultrasonic-wave reception sensor 13 to make them resistant to the strong rain outdoors.

Turning now to the disadvantage to be overcome by the invention, because of the cover provided over an ultrasonic-wave sensor of the water-proof type, the total gain is reduced. Therefore, when using ultrasonic-wave sensors of a water-proof type as the ultrasonic-wave transmission sensor 3 and the ultrasonic-wave reception sensor 13, the range of measurement of distance becomes shorter. For example, when using ultrasonic-wave sensors of the water-proof type, it is normally only possible to stably measure a distance of 4 to 5 meters.

However, when using an ultrasonic-wave distance measuring apparatus of the separate transmission and reception type reflection system as a proximity sensor of a vehicle, the measurement of a longer distance is desired. It is therefore desired to improve the ultrasonic-wave distance measuring apparatus of the separate transmission and reception type reflection system using ultrasonic-wave sensors of waterproof types.

One method to make the measurable distance longer is to raise the voltage for exciting the transmission ultrasonic-wave sensor 3 within the range of the allowable applied voltage. However, if the voltage for energizing the ultrasonic-wave transmission sensor 3 is raised, the ultrasonic-wave transmission sensor 3 will vibrate more and the vibration will continue for a longer time. As a result, the ultrasonic-wave reception sensor 13 installed near to the ultrasonic-wave transmission sensor 3 will generate an electric signal in response to the vibration of the ultrasonic-wave transmission sensor 3 which will make accurate distance measurement difficult. Especially, an accurate measurement of short distances will become difficult.

As a countermeasure for this, it is necessary to separate the members for mounting the ultrasonic-wave transmission sensor 3 and the ultrasonic-wave reception sensor 13 and to take steps to prevent the vibration at the plate mounting the ultrasonic-wave transmission sensor 3 and the plate mounting the ultrasonic-wave reception sensor 13. However, these anti-vibration countermeasures are complicated, they enlarge the size of the apparatus, and make mounting conditions in the vehicle tougher. Furthermore, the price of the ultrasonic-wave distance measuring apparatus of the separate transmission and reception type reflection system becomes much higher and installation in a vehicle becomes difficult in terms of cost. Accordingly, there are limits to the method of raising the voltage for energizing the ultrasonic-wave transmission sensor 3.

Normally, the ultrasonic-wave receiver 11 is provided with an automatic gain control (AGC) circuit for automatic gain control of the received ultrasonic-wave signal. However, the automatic gain control has the following disadvantages described with reference to FIG. 2. FIG. 2 is a graph showing the automatic gain control.

Automatic gain control is, generally speaking, a correlation response of the level of an input signal. Accordingly, the apparatus operates at the same total gain for different distances being measured, so operates at the total gain for short distances as well. In FIG. 2, if the relative gain at the point b at the input level of the point a is made zero (reference level), the relative gain becomes maximum to the maximum differential value of the ultrasonic-wave transmission sensor 3 when the input level is low. As a result, in the case of a short distance measurement, the ultrasonic-wave reception sensor 13 is easily electrically influenced by the mechanical vibration of the ultrasonic-wave transmission sensor 3. To prevent this, countermeasures for the vibration of the ultrasonic-wave transmission sensor 3 are necessary, however, such countermeasures for vibration have the disadvantages described above.

Contrary to the above discussion, when adopting a system where the response falls as the level of the input signal received in the ultrasonic-wave reception sensor 13 becomes larger, the sensitivity at the time of measuring a long distance falls tremendously, so such an ultrasonic-wave distance measuring apparatus of the separate transmission and reception type reflection system becomes unsuitable for long distance measurement.

The sensitivity to the reflected ultrasonic-wave from the distance measured object 7 differs when the distance measured object 7 is, for example, metal, concrete, or a human body. Therefore, processing for measuring distance which takes into account the type of the distance measured object 7 is necessary for stable precise distance measurement. However, such processing has not been carried out.

When using the ultrasonic-wave distance measuring apparatus of the separate transmission and reception type reflection system shown in FIG. 1 for an apparatus for detecting obstacles for vehicles, when the speed of the vehicle becomes more than a certain value, the noise of the reception antenna of the vehicle passing against the air, the noise of the tires running over the road surface, so forth generate ultrasonic waves. It was found that these were detected by the ultrasonic-wave reception sensor 13 and resulted in erroneous operation in the distance measurement.

While the above considered the case of use of the ultrasonic-wave distance measuring apparatus of the separate transmission and reception type reflection system to vehicles as an example, similar disadvantages as the above are encountered not only when mounting an ultrasonic-wave distance measuring apparatus of the separate transmission and reception type reflection system to a vehicle, but other cases as well.

SUMMARY OF THE INVENTION

An object of the present invention is to provide an ultrasonic-wave distance measuring method and apparatus of the separate transmission and reception type reflection system which can precisely and stably measure a distance ranging from a close to distant distance.

Another object of the present invention is to provide an ultrasonic-wave distance measuring method and apparatus of the separate transmission and reception type reflection system which can precisely and stably measure a distance ranging from a close to distant distance without making the configuration of the apparatus complex.

Still another object of the present invention is to provide an ultrasonic-wave distance measuring method and apparatus of the separate transmission and reception type reflection system which can precisely and stably measure a distance ranging from a close to distant distance in accordance with the type of the object measured.

Still another object of the present invention is to provide an ultrasonic-wave distance measuring method and apparatus of the separate transmission and reception type reflection system which can precisely and stably measure a distance ranging from a close to distant distance and is free from influence caused by movement when mounted on a vehicle or other moving object.

According to a first aspect of the present invention, there is provided an ultrasonic-wave distance measurement method of a separate transmission and reception type reflection system which receives an ultrasonic wave emitted from an ultrasonic-wave transmission sensor and reflected at a distance measured object by an ultrasonic-wave reception sensor, measures a time from the transmission of the ultrasonic wave to the reception of the same, and performs sensitivity correction in accordance with a type of the distance measured object and the distance to be measured when measuring the distance between the ultrasonic-wave transmission sensor or the ultrasonic-wave reception sensor and the distance measured object from the obtained time, the method including the steps of measuring a time from the transmission of an ultrasonic wave emitted from the ultrasonic-wave transmission sensor to the distance measured object to the reception of the same, calculating a provisional distance from the obtained time, measuring attenuation characteristics of the reflected ultrasonic-wave by comparing an amplitude with a reference reflection ultrasonic-wave, and preparing ultrasonic-wave sensor sensitivity correction data from the attenuation characteristics with respect to every type of distance measured object and various distances between the distance measured object and the ultrasonic-wave transmission sensor or the ultrasonic-wave reception sensor; setting a type of the distance measured object prior to an actual distance measurement; starting counting simultaneously with the emission of an ultrasonic-wave signal to the distance measured object by driving the ultrasonic-wave transmission sensor; stopping the counting simultaneously with the reception of the reflected wave by the ultrasonic-wave reception sensor, measuring a time from the driving of the ultrasonic-wave transmission sensor to the reception of the reflected wave by the ultrasonic-wave reception sensor, calculating a provisional distance between the ultrasonic-wave transmission sensor or the ultrasonic-wave reception sensor and the distance measured object based on the obtained time, generating ultrasonic-wave sensor sensitivity correction data for reception corresponding to the calculated provisional distance and the set type of the distance measured object, and enabling the sensitivity correction in an ultrasonic-wave signal sensitivity correction portion for reception; starting counting simultaneously with the emission of the ultrasonic-wave signal to the distance measured object by driving the ultrasonic-wave transmission sensor again; and stopping the counting simultaneously with the reception of a reflected wave larger than a predetermined level by the ultrasonic-wave reception sensor again, measuring a time from the driving of the ultrasonic-wave transmission sensor to the reception of the reflected wave by the ultrasonic-wave reception sensor, and calculating the actual distance between the ultrasonic-wave transmission sensor or the ultrasonic-wave reception sensor and the distance measured object based on the obtained time.

Preferably, when the ultrasonic-wave transmission sensor and the ultrasonic-wave reception sensor are installed in an apparatus and when the apparatus and the distance measured object are relatively movable, the method further includes the steps of measuring a relative speed between the apparatus and the distance measured object and calculating the distance measurement only when the measured speed is within a predetermined range.

Preferably, the ultrasonic-wave transmission sensor is a water-proof type ultrasonic-wave transmission sensor; and the ultrasonic-wave reception sensor is a water-proof type ultrasonic-wave reception sensor.

According to a second aspect of the present invention, there is provided an ultrasonic-wave distance measurement method of a separate transmission and reception type reflection system which receives an ultrasonic wave emitted from an ultrasonic-wave transmission sensor and reflected at a distance measured object by an ultrasonic-wave reception sensor, measures a time from the transmission of the ultrasonic wave to the reception of the same, and performs sensitivity correction in accordance with a distance to a specific distance measured object when measuring the distance between the ultrasonic-wave transmission sensor or the ultrasonic-wave reception sensor and the distance measured object from the obtained time, the method including the steps of measuring a time from transmission when an ultrasonic wave is emitted from the ultrasonic-wave transmission sensor to the distance measured object to reception of the same, calculating a provisional distance from the obtained time, measuring attenuation characteristics of the reflected ultrasonic wave by comparing an amplitude with a reference reflection ultrasonic wave, and preparing ultrasonic-wave sensor sensitivity correction data from the attenuation characteristics with respect to a specific type of the distance measured object and various distances between the distance measured object and the ultrasonic-wave transmission sensor or the ultrasonic-wave reception sensor; starting counting simultaneously with the emission of an ultrasonic-wave signal to the distance measured object by driving the ultrasonic-wave transmission sensor; stopping the counting simultaneously with the reception of the reflected wave by the ultrasonic-wave reception sensor, measuring a time from the driving of the ultrasonic-wave transmission sensor to the reception of the reflected wave by the ultrasonic-wave reception sensor, calculating a provisional distance between the ultrasonic-wave transmission sensor or the ultrasonic-wave reception sensor and the distance measured object based on the obtained time, generating the ultrasonic-wave sensor sensitivity correction data for reception corresponding to the calculated provisional distance, and enabling the sensitivity correction in an ultrasonic-wave signal sensitivity correction portion for reception; starting counting simultaneously with the emission of the ultrasonic-wave signal to the distance measured object by driving the ultrasonic-wave transmission sensor again; and stopping the counting simultaneously with the reception of the reflected wave by the ultrasonic-wave reception sensor again, measuring a time from the driving of the ultrasonic-wave transmission sensor to the reception of the reflected wave by the ultrasonic-wave reception sensor, and calculating an actual distance between the ultrasonic-wave transmission sensor or the ultrasonic-wave reception sensor and the distance measured object based on the obtained time.

Preferably, when the ultrasonic-wave transmission sensor and the ultrasonic-wave reception sensor are installed in an apparatus and when the apparatus and the distance measured object are relatively movable, the method further includes the steps of measuring the relative speed of the apparatus and the distance measured object and calculating the distance measurement only when the measured speed is within a predetermined range.

Preferably, the ultrasonic-wave transmission sensor is a water-proof type ultrasonic-wave transmission sensor; and the ultrasonic-wave reception sensor is a water-proof type ultrasonic-wave reception sensor.

According to a third aspect of the present invention, there is provided an ultrasonic-wave distance measuring apparatus of a separate transmission and reception type reflection system which receives an ultrasonic wave emitted from an ultrasonic-wave transmission sensor and reflected at a distance measured object by an ultrasonic-wave reception sensor, measures a time from the transmission of the ultrasonic wave to the reception of the same, and measures a distance between the ultrasonic-wave transmission sensor or the ultrasonic-wave reception sensor and the distance measured object from the obtained time, the apparatus comprising a transmitter for performing drive control of the ultrasonic-wave transmission sensor; a receiver for performing distance measurement by processing a signal from the ultrasonic-wave reception sensor; and a control means for controlling the transmitter and the receiver; the receiver comprising a type setting apparatus for setting a type of the distance measured object, a sensitivity correction circuit for correcting a sensitivity of the received signal in the ultrasonic-wave reception sensor, a detection circuit for detecting an output of the sensitivity correction circuit, and a distance measurement calculation control means; the distance measurement calculation control means storing in advance sensitivity correction data of the ultrasonic-wave reception sensor obtained by measuring a received wave by the ultrasonic-wave reception sensor when an ultrasonic-wave is emitted to the distance measured object by the ultrasonic-wave transmission sensor and generating the sensitivity correction data of the ultrasonic-wave reception sensor from the measured data with respect to every type of the distance measured object and various distances between the distance measured object and the ultrasonic-wave transmission sensor or the ultrasonic-wave reception sensor; the control means making the transmitter perform a first ultrasonic-wave transmission operation from the ultrasonic-wave transmission sensor and the receiver to start counting simultaneously; the distance measurement calculation control means of the receiver measuring a time from the first driving of the ultrasonic-wave transmission sensor by the transmitter to the reception of the reflected ultrasonic-wave by the ultrasonic-wave reception sensor, measuring a provisional distance between the ultrasonic-wave transmission sensor or the ultrasonic-wave reception sensor and the distance measured object, and generating ultrasonic-wave sensor sensitivity correction data corresponding to the calculated provisional distance and a degree of the distance measured object set by the type setting apparatus, setting the same to the ultrasonic signal sensitivity correction circuit for reception, and instructing the completion of setting the ultrasonic-wave sensor sensitivity correction data to the control apparatus; the control means, in response to the completion of the processing of the distance measurement calculation control circuit, making the transmitter perform a second ultrasonic-wave transmission operation and the receiver start counting simultaneously; and the distance measurement calculation control means of the receiver measuring a time from the second driving of the ultrasonic-wave transmission sensor in the transmitter to the detection of reception of the reflected ultrasonic-wave and calculating the actual distance between the ultrasonic-wave transmission sensor or the ultrasonic-wave reception sensor and the distance measured object by using the obtained time.

Preferably, when the ultrasonic-wave transmission sensor and the ultrasonic-wave reception sensor are installed in an apparatus and the apparatus and the distance measured object are relatively movable; the apparatus further comprises a speed measurement means for measuring the relative speed of the apparatus and the distance measured object and the distance measurement calculation control means performing the distance measurement processing only when the measured speed by the speed measurement means is within a predetermined range.

Preferably, the ultrasonic-wave transmission sensor is a water-proof type ultrasonic-wave transmission sensor; and the ultrasonic-wave reception sensor is a water-proof type ultrasonic-wave sensor.

Preferably, the distance measurement calculation control means comprises a storing means for storing sensitivity correction data of the ultrasonic-wave reception sensor obtained by measuring a received wave by the ultrasonic-wave reception sensor when the ultrasonic-wave is emitted to the distance measured object by the ultrasonic-wave transmission sensor and measuring the sensitivity correction data of the ultrasonic-wave reception sensor from the measured data with respect to every type of the distance measured object and various distances between the distance measured object and the ultrasonic-wave transmission sensor or the ultrasonic-wave reception sensor, a reflected ultrasonic-wave reception detection means for detecting the reception of the reflected ultrasonic wave by identifying a level of the received signal received via the sensitivity correction circuit and the detection circuit by the ultrasonic-wave reception sensor, a time counting means for measuring a time from the transmission of the ultrasonic wave to the distance measured object to the reception of the ultrasonic wave by starting counting based on an instruction from the control means and stopping timing when the reception is detected by the reflected ultrasonic-wave reception detection means, a distance calculation means for calculating a distance from the obtained time, and a sensitivity correction data generation means for selecting the sensitivity correction data in the sensitivity correction circuit from the calculated distance and the type of the distance measured object; the control means makes the transmitter perform the first ultrasonic-wave transmission operation from the ultrasonic-wave transmission sensor and instructs start of counting to the time counting means in the distance measurement calculation control means of the receiver simultaneously; in the distance measurement calculation control circuit of the receiver, the time counting means measures a time from the first driving of the ultrasonic-wave transmission sensor in the transmitter to the reception by the ultrasonic-wave reception sensor, the distance calculation means measures a provisional distance between the ultrasonic-wave transmission sensor or the ultrasonic-wave reception sensor and the distance measured object by using the obtained time, the sensitivity correction data generation means generates the ultrasonic-wave sensor sensitivity correction data corresponding to the calculated provisional distance and the type of the distance measured object set by the type setting apparatus, sets the same to the ultrasonic-wave signal sensitivity correction circuit portion for reception, and instructs the control circuit of the completion of setting the ultrasonic-wave sensor sensitivity correction data; the control means, in response to the completion of the processing of the distance measurement calculation control circuit, makes the transmitter perform the second ultrasonic-wave transmission operation and instructs the start of counting to the time counting means in the distance measurement calculation control means of the receiver simultaneously; in the distance measurement calculation control circuit of the reception circuit, the time counting means measures a time from the second driving of the ultrasonic-wave transmission sensor in the transmitter to when the reception is detected by the reflected ultrasonic-wave reception detection means and the distance calculation means calculates the actual distance between the ultrasonic-wave transmission sensor or the ultrasonic-wave reception sensor and the distance measured object by using the obtained time.

Preferably, the transmitter for performing the driving control of the ultrasonic-wave transmission sensor includes a transmission power control circuit capable of controlling a voltage applied to the ultrasonic-wave transmission sensor; the distance measurement calculation control means in the receiver determines the voltage applied to the ultrasonic-wave transmission sensor in accordance with the result of the provisional distance calculation and outputs the determined value to the transmission power control circuit; and the ultrasonic-wave transmission sensor operates in response to the voltage determined by the distance measurement calculation control means at the second excitation.

BRIEF DESCRIPTION OF THE DRAWINGS

These and other objects and features of the present invention will become clearer from the following description of the preferred embodiments with reference to the accompanying drawings, in which:

FIG. 9 is a view of the configuration of an ultrasonic-wave distance measuring apparatus of a separate transmission and reception type reflection system according to a fourth embodiment of the present invention; and FIG. 10 is a view of the configuration of an ultrasonic-wave distance measuring apparatus of a separate transmission and reception type reflection system according to a fifth embodiment of the present invention.

DESCRIPTION OF THE PREFERRED EMBODIMENTS

Below, preferred embodiments of the ultrasonic-wave distance measuring method and apparatus of the separate transmission and reception type reflection system of the present invention will be described with reference to the accompanying drawings.

First Embodiment

Figure 1:
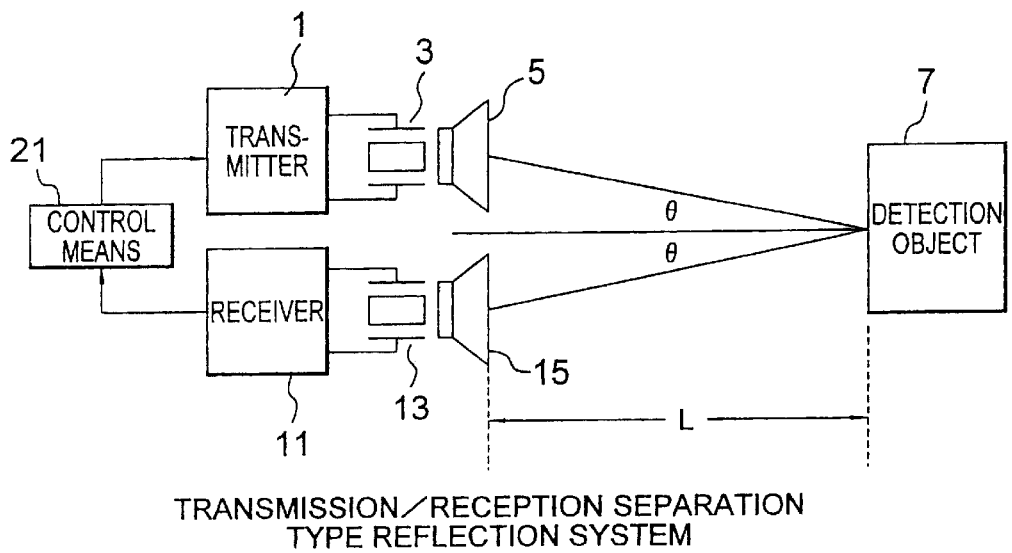
FIG. 1 is a view of the configuration of an ultrasonic-wave distance measuring apparatus of a separate transmission and reception type reflection system.
Figure 2:
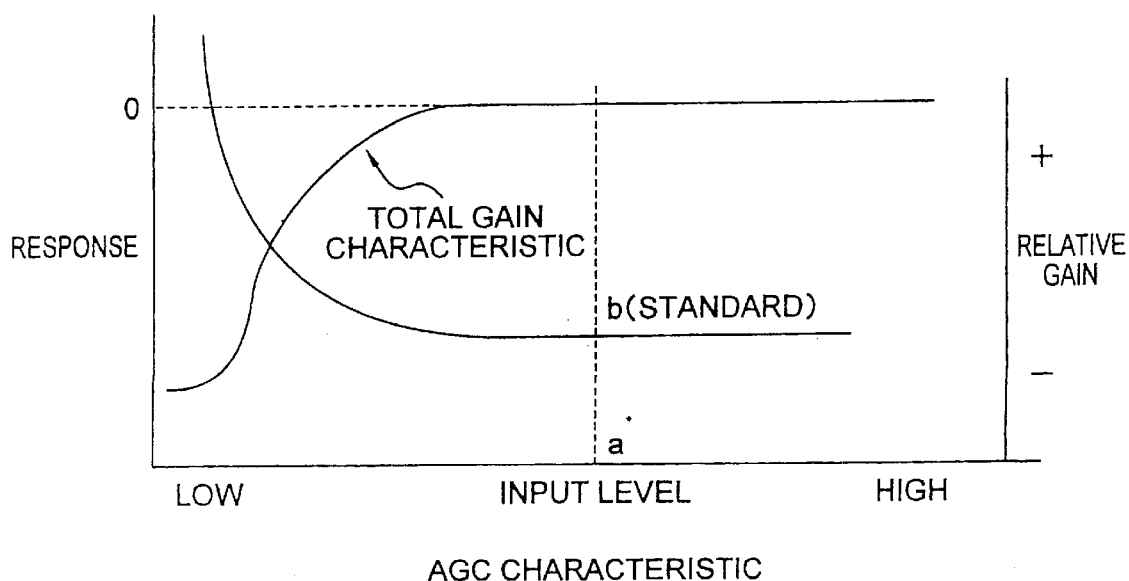
FIG. 2 is a view of the AGC characteristics of an ultrasonic-wave distance measuring apparatus of a separate transmission and reception type reflection system of the related art.

An ultrasonic-wave distance measuring apparatus of the separate transmission and reception type reflection system according to a first embodiment of the present invention comprises, as shown in FIG. 1, a transmission portion having an ultrasonic-wave transmitter 1, an ultrasonic-wave transmission sensor 3, and a transmission horn antenna 5, a reception portion having a reception horn antenna 15, an ultrasonic-wave reception sensor 13, and an ultrasonic-wave receiver 11, and a control apparatus 21 for controlling both the ultrasonic-wave transmitter 1 and the ultrasonic-wave receiver 11.

The basic configuration and the basic operation of the ultrasonic-wave distance measuring apparatus of the separate transmission and reception type reflection system of the present invention are similar to the ultrasonic-wave distance measuring apparatus of the separate transmission and reception type reflection system of the related art. However, as will be obvious from the description below, the circuit configurations and the operations of the ultrasonic-wave transmitter 1, the ultrasonic-wave receiver 11, and the control apparatus 21 are different from those of the related art.

The basic operation of the ultrasonic-wave distance measuring apparatus of the separate transmission and reception type reflection system shown in FIG. 1 will be described again. The control apparatus 21 controls the ultrasonic-wave transmitter 1 and the ultrasonic-wave receiver 11 in response to a request for measuring a distance in the way explained below.

The control apparatus 21 outputs a request for transmission to the ultrasonic-wave transmitter 1 first. The request for transmission is made, for example, successively in a predetermined cycle.

The ultrasonic-wave transmitter 1 applies a predetermined voltage to the ultrasonic-wave transmission sensor 3 in response to the request for transmission from the control apparatus 21 to energize the transmission ultrasonic-wave sensor 3 to generate an ultrasonic wave. The ultrasonic wave emitted from the ultrasonic-wave transmission sensor 3 is directed to the distance measured object 7 at the transmission horn antenna 5.

The ultrasonic wave reflected at the distance measured object 7 arrives at the ultrasonic-wave reception sensor 13 via the reception horn antenna 15. The ultrasonic-wave reception sensor 13 outputs an electric signal in accordance with the level of the incident ultrasonic wave. Normally, the ultrasonic-wave transmission sensor 3 vibrates to generate an ultrasonic wave, so the ultrasonic wave reflected at the distance measured object 7 also vibrates and the electric signal corresponding to the received ultrasonic wave from the ultrasonic-wave reception sensor 13 is a pulse signal. The ultrasonic-wave receiver 11 measures the time from the start of the transmission of the ultrasonic wave at the ultrasonic-wave transmission sensor 3 to the reception of the reflected ultrasonic wave by the ultrasonic-wave reception sensor 13 and calculates the distance between the distance measured object 7 and the ultrasonic-wave transmission sensor 3 or the ultrasonic-wave reception sensor 13.

The angle $\theta$ made by the center axis of the ultrasonic-wave transmission sensor 3 (or the center axis of the direction of the transmission horn antenna 5) and the center axis of the ultrasonic-wave reception sensor 13 (or the center axis of the direction of the reception horn antenna 15) is preferably as close to 0 as possible. When the angle $\theta$ becomes large, the ultrasonic wave emitted from the ultrasonic-wave transmission sensor 3 and reflected at the distance measured object 7 becomes hard to receive. Therefore, the ultrasonic-wave transmission sensor 3 and the ultrasonic-wave reception sensor 13 are arranged to be close to each other and the directivity is heightened by using the transmission horn antenna 5 and reception horn antenna 15. Also, noise around the distance measuring environment is reduced as much as possible by using the transmission horn antenna 5 and the reception horn antenna 15. Furthermore, the reflected ultrasonic wave is collected by using the reception horn antenna 15.

Note that, in terms of preventing the influence of the vibration of the transmission ultrasonic-wave sensor 3 as much as possible, it is preferable to separate a plate mounting the ultrasonic-wave transmission sensor 3 and a plate mounting the ultrasonic-wave reception sensor 13.

As the ultrasonic-wave transmission sensor 3, an ultrasonic-wave sensor of a piezoelectric ceramic type, for example, a piezoelectric sensor of lithium niobate, can be used. In this case, for example, when the vibration frequency is 40 kHz, the voltage to energize the ultrasonic-wave transmission sensor 3 is about 100V (rms).

As the ultrasonic-wave reception sensor 13, in the same way as the ultrasonic-wave transmission sensor 3, an ultrasonic-wave sensor of a piezoelectric ceramic type, for example, a piezoelectric sensor of lithium niobate, can be used.

The ultrasonic-wave receiver 11 will be described in detail next.

Figure 3:
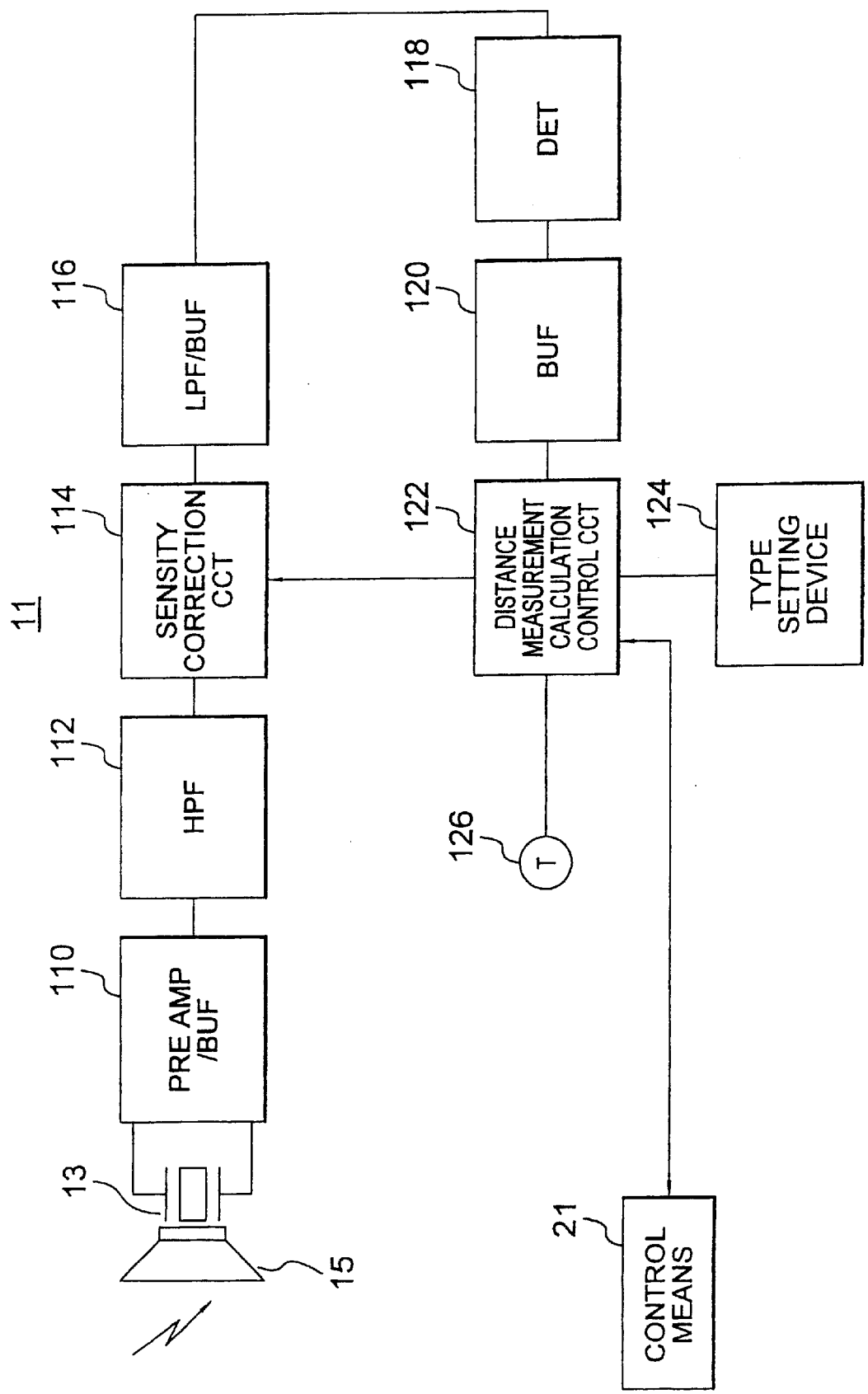
FIG. 3 is a view of the configuration of a first embodiment of an ultrasonic-wave distance measuring apparatus of a separate transmission and reception type reflection system of the present invention.

FIG. 3 is a view especially showing the circuit configuration of the ultrasonic-wave receiver 11 in the ultrasonic-wave distance measuring apparatus of the separate transmission and reception type reflection system.

The ultrasonic-wave receiver 11 comprises a pre-stage amplification circuit/buffer circuit 110, a high frequency signal filtering circuit 112, a distance measurement sensitivity correction circuit 114, a low frequency signal filtering circuit/buffer circuit 116, a detection circuit 118, a buffer circuit 120, a distance measurement calculation control circuit 122, a type setting device 124, and a temperature sensor 126.

In the ultrasonic-wave distance measuring apparatus of the separate transmission and reception type reflection system of the present embodiment, especially in the distance measurement calculation control circuit 122, ultrasonic-wave sensor sensitivity correction data for correcting the sensitivity in the distance measurement sensitivity correction circuit 114 is generated. The sensitivity of the received ultrasonic-wave signal is corrected based on the ultrasonic-wave sensor sensitivity correction data in the distance measurement sensitivity correction circuit 114. The ultrasonic-wave sensor sensitivity correction data is determined based on the type of the distance measured object 7, for example, metal, concrete, a human body, etc., set by the type setting device 124 and the distance measured by the distance measurement calculation control circuit 122. Therefore, data for the ultrasonic-wave sensor sensitivity correction data is collected in advance and stored in a memory means.

The basic operation of the ultrasonic-wave distance measuring apparatus of the separate transmission and reception type reflection system will be described next.

As described above, the ultrasonic-wave sensor sensitivity correction data is collected in advance.

At the time of actual measurement, first, the ultrasonic-wave transmission sensor 3 is driven and the provisional distance is measured in the distance measurement calculation control circuit 122 from the signal received at the ultrasonic-wave reception sensor 13 in a state where sensitivity correction is not performed in the distance measurement sensitivity correction circuit 114. The distance measurement calculation control circuit 122 also generates the ultrasonic-wave sensor sensitivity correction data to be processed in the ultrasonic-wave receiver 11 in accordance with the obtained provisional distance and the type of the distance measured object 7 set by the type setting device 124 and sets the same in the distance measurement sensitivity correction circuit 114.

Next, the ultrasonic-wave transmission sensor 3 is driven again. The sensitivity correction is performed on the signal received by the ultrasonic-wave reception sensor 13 in the distance measurement sensitivity correction circuit 114. The received signal after the sensitivity correction is detected by the detection circuit 118, and the distance measurement calculation control circuit 122 calculates the actual distance from the time between the transmission and the reception.

The operations of the circuits in the ultrasonic-wave receiver 11 will now be described.

The pre-stage amplification circuit/buffer circuit 110 has an amplification circuit to amplify a weak electric signal from the ultrasonic-wave reception sensor 13 to a predetermined level which can be processed in the latter stage.

The high frequency signal filtering circuit 112 passes the high frequency component in the signal corresponding to the reflected ultrasonic-wave amplified in the amplification circuit in the pre-stage amplification circuit/buffer circuit 110 and removes the low frequency component. As a result, the low frequency noise included in the reflected ultrasonic-wave from the distance measured object 7 can be eliminated.

The distance measurement sensitivity correction circuit 114 has a variable gain amplification circuit to correct the sensitivity of the signal from the high frequency signal filtering circuit 112. A detailed description is as follows.

The low frequency signal filtering circuit/buffer circuit 116 passes the low frequency signal component in the output signal from the distance measurement sensitivity correction circuit 114 so that the detection circuit 118 in the latter stage can detect it.

The detection circuit 118 detects the output signal from the low frequency signal filtering circuit/buffer circuit 116. The detection in the detection circuit 18 is, for example, envelope detection.

The buffer circuit 120 successively stores the continuous signal detected by the detection circuit 118 as digital data.

The data successively stored in the buffer circuit 120 indicates a signal waveform subjected to envelope detection in the detection circuit 118.

The distance measurement calculation control circuit 122 compares the level of the signal from the buffer circuit 120 and judges the reception of the reflected ultrasonic-wave. When the reflected ultrasonic-wave is detected, the distance measurement calculation control circuit 122 stops the time counting means, measures the time from the start of the vibration by the ultrasonic-wave transmission sensor 3 to the reception by the ultrasonic-wave reception sensor 13, and calculates the distance from the obtained time. Also, the distance measurement calculation control circuit 122 generates ultrasonic-wave sensor sensitivity correction data in the distance measurement sensitivity correction circuit 114. The circuit configuration and the operation of the distance measurement calculation control circuit 122 will be described with reference to FIG. 4.

The type setting device 124 sets the type of the distance measured object 7.

The temperature sensor 126 takes the ambient temperature around the transmission ultrasonic-wave reception sensor 13 (i.e., an outside air temperature). The distance measurement calculation control circuit 122 receives as input the temperature taken by the temperature sensor 126, calculates a propagation velocity of an ultrasonic wave at that time, and calculates the distance using the propagation velocity. The calculation formula will be described later on.

Figure 4:
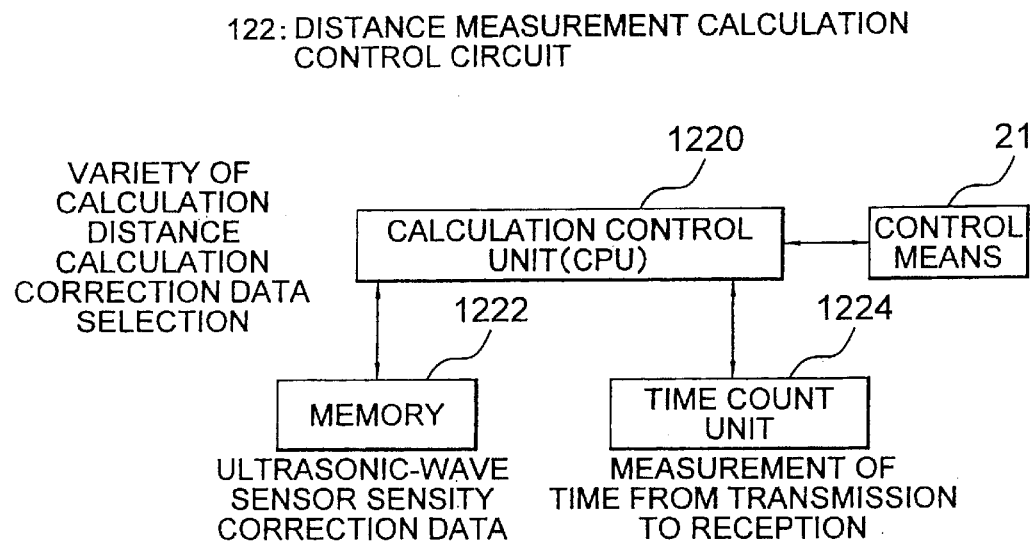
FIG. 4 is a view of the configuration of a calculation control circuit for distance measurement in the illustrated ultrasonic-wave distance measuring apparatus of a separate transmission and reception type reflection system.

The distance measurement calculation control circuit 122 performing this various calculation and control processing is preferably configured by using a computer and has the configuration shown in FIG. 4.

FIG. 4 is a view of the configuration of the distance measurement calculation control circuit 122.

The distance measurement calculation control circuit 122 using a computer comprises a central processing unit (CPU) 1220, a memory 1222, and a time counting unit 1224.

The CPU 1220 performs a variety of calculation and control processing described in detail later on.

The memory 1222 stores the ultrasonic-wave sensor sensitivity correction data described in detail with reference to FIG. 5 later on.

The time counting unit 1224 measures the time from the transmission of the ultrasonic wave by the ultrasonic-wave transmission sensor 3 to the reception of the same by the ultrasonic-wave reception sensor 13.

The ultrasonic-wave sensor sensitivity correction data stored in the memory 1222 will be described with reference to FIGS. 5 and 6.

The strength of the reflected wave (the amplitude at the ultrasonic-wave reception sensor 13) of the ultrasonic wave emitted from the reception ultrasonic-wave transmission sensor 3 and reflected at the distance measured object 7 differs depending on the type of the distance measured object 7. Also, even in the case of the same distance measured object 7, the strength of the reflected wave (the amplitude at the ultrasonic-wave reception sensor 13) varies in accordance with the distance from the ultrasonic-wave transmission sensor 3 or ultrasonic-wave reception sensor 13 (hereinafter simply referred to as an ultrasonic-wave sensor). Namely, when an ultrasonic wave generated by energizing the ultrasonic-wave transmission sensor 3 under the same conditions is reflected at the distance measured object 7, the strength of the ultrasonic wave received by the ultrasonic-wave reception sensor 13 varies in response to the type, material, and degree of roughness of the surface of the distance measured object 7. For example, the signal level of the received frequency by the ultrasonic-wave reception sensor 13 varies in the case where the surface of the distance measured object 7 is a smooth and firm metal and in the case of a concrete having a rougher surface than metal and a low hardness.

Also, even when the distance measured object 7 is the same material, for example, a metal, the amplitude of the reflected ultrasonic wave received by the ultrasonic-wave reception sensor 13 becomes smaller as the distance between the ultrasonic-wave sensor and the distance measured object 7 becomes longer.

Here, the following measurements will be carried out.

(1) First, the reference attenuation characteristics are measured with respect to a reference distance measured object 7, for example, a mirror or other member which ideally reflects an ultrasonic wave.

Namely, a mirror is used as the distance measured object 7 and struck by an ultrasonic wave from the ultrasonic-wave transmission sensor 3. The reflected ultrasonic wave received by the ultrasonic-wave reception sensor 13 passes though the pre-stage amplification circuit/buffer circuit 110, the high frequency signal filtering circuit 112, the distance measurement sensitivity correction circuit 114, and the low frequency signal filtering circuit/buffer circuit 116. The signal detected by the detection circuit 118 is continuously stored in the buffer circuit 120, and the detected waveform is stored, for example, in the memory 1222 shown in FIG. 4. Especially, the maximum amplitude is detected and stored. The above measurement is carried out by changing the distance between the distance measured object 7 and the ultrasonic-wave transmission sensor 3. The data obtained as a result is the reference attenuation characteristics data.

(2) Next, the data when changing the distance between the distance measured object 7 and the ultrasonic-wave transmission sensor 3 is obtained with respect to the distance measured object 7 of various type of materials and stored in the memory 1222 in the same way as above.

(3) The reference attenuation characteristics and the data measured for a variety of the distance measured objects 7 are compared and the attenuation data with respect to the reference attenuation characteristics is calculated. For example, the difference between the maximum amplitude in the reference attenuation characteristics and the maximum amplitude in the attenuation characteristics in the respective objects 7 is calculated as relative attenuation characteristics of the objects 7.

Figure 5:
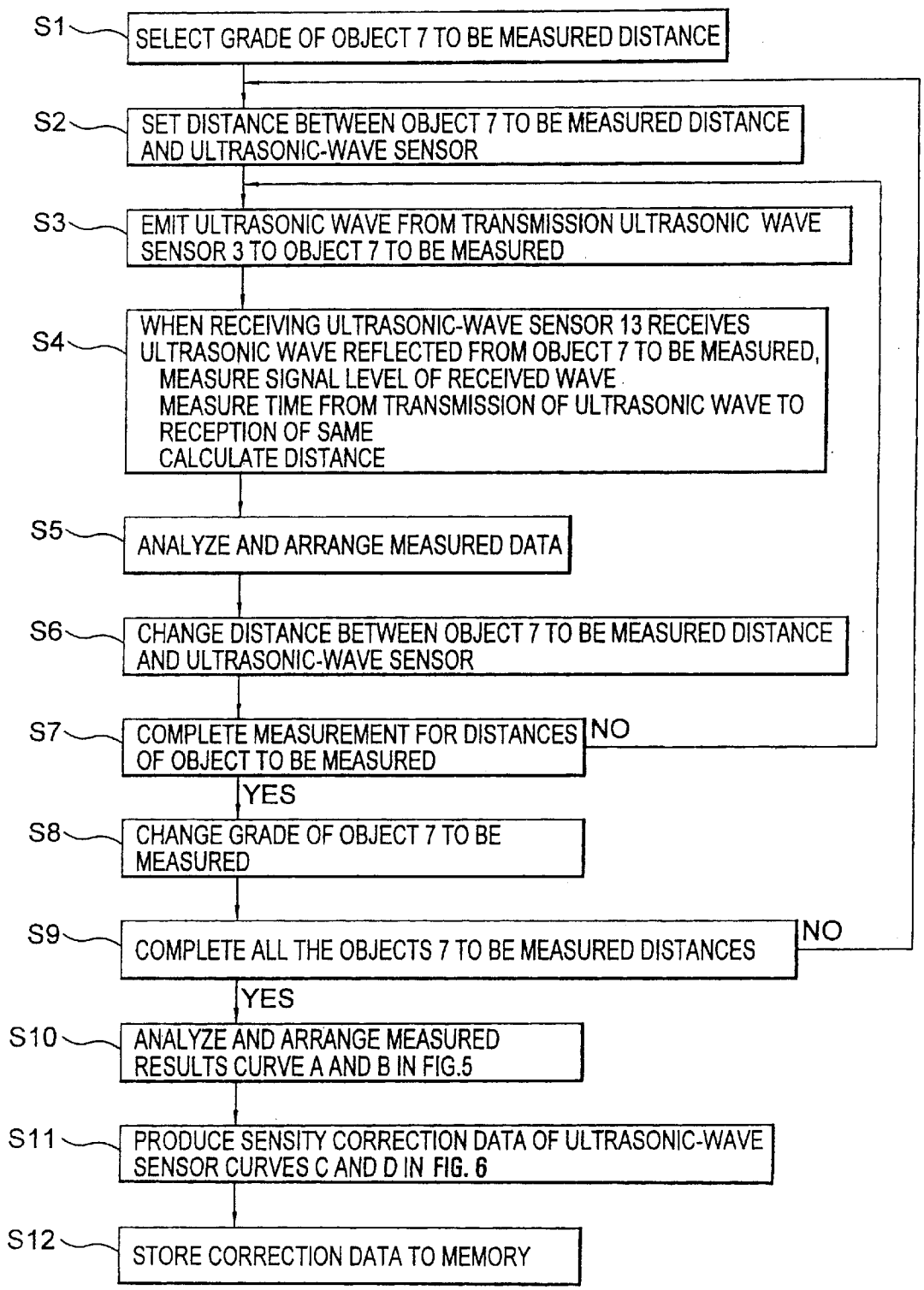
FIG. 5 is a flow chart of the method for obtaining ultrasonic-wave sensor sensitivity correction data.

FIG. 5 is a flow chart of the procedure for determining the above ultrasonic-wave sensor sensitivity correction data.

The processing described with reference to FIG. 5 is the processing carried out off-line in advance in the same way as in a factory and so forth. The ultrasonic-wave distance measuring apparatus of the separate transmission and reception type reflection system shown in FIGS. 1, 3, and 4 can be used for carrying out the processing. Further, instead of an ultrasonic-wave distance measuring apparatus of the separate transmission and reception type reflection system, an apparatus which can perform the following basic operations can be also used. Below, a case of using the apparatus shown in FIGS. 3 and 4 for the measurement will be explained as an example.

Step 1:

The type of the distance measured object 7 is selected in the distance measurement calculation control circuit 122 via the type setting apparatus 124. This is first done for a reference mirror as the distance measured object 7. Then, the distance measured object 7 is changed to a metal, concrete, and so forth.

Step 2:

The distance Lt between the distance measured object 7 and the ultrasonic-wave sensor is set and precisely measured by using distance measurement tools.

Note that the sensitivity correction by the ultrasonic-wave sensor sensitivity correction data is not performed in the distance measurement sensitivity correction circuit 114 in the initial state.

Step 3:

The control apparatus 21 energizes the ultrasonic-wave transmission sensor 3 by using the ultrasonic-wave transmitter 1 to make it emit an ultrasonic wave to the distance measured object 7. At the same time, the control apparatus 21 makes the time counting unit 1224 in the distance measurement calculation control circuit 122 start counting.

Step 4:

The ultrasonic wave reflected at the distance measured object 7 is received by the ultrasonic-wave reception sensor 13. When the signal detected by the detection circuit 118 exceeds a predetermined level, it is judged that a proper reflected ultrasonic wave is received and the time counting unit 1224 stops the time counting. The count at which the time counting unit 1224 stopped counting is the time from the start of vibration of the ultrasonic-wave transmission sensor 3 to the reception by the ultrasonic-wave reception sensor 13. The CPU 1220 in the distance measurement calculation control circuit 122 calculates the distance Lm between the distance measured object 7 and the ultrasonic-wave sensor from the obtained time. The distance Lx to be measured can be calculated based on the equation below:

$$Lx = (V \times S)/2$$

where,
V is the propagation velocity of an ultrasonic wave in the air at a temperature t.

$$V = 331.5 + 0.6t \text{ (m/sec)}$$

S is a time from the start of vibration of the ultrasonic-wave transmission sensor 3 to the reception of the first reflected wave by the ultrasonic-wave reception sensor 13.

Note that the propagation velocity of the ultrasonic wave can be calculated by using the temperature taken by the temperature sensor 126 as the temperature at measurement as well as by using the reference temperature of, for example, t=20° C. The propagation velocity V of an ultrasonic wave when t=20° C is 332.7 m/sec.

Step 5:

The calculated distance Lm and the measuring conditions are arranged.

Step 6:

The above measurement processing from step 3 to step 5 is repeated while changing the distance between the distance measured object 7 and the ultrasonic-wave sensor.

Step 7:

When the distance measurement of the distance measured object 7 and the ultrasonic-wave sensor has been carried out for a predetermined range, a set of attenuation characteristics is obtained for the type of the distance measured object 7.

Step 8:

The above measurement processing is repeated from step 2 after changing the type of the distance measured object 7.

Step 9:

The above processing is repeated until the completion of the above measurement for all the types of distance measured object 7 to be covered.

Step 10:

When the above processing is completed for all of the types of distance measured object 7 covered for all of the distance measurement range, the results of the measurement are organized. Then, curves of the ultrasonic-wave attenuation shown as curves A and B in FIG. 6 as examples are prepared in comparison with the case where a mirror is used as the distance measured object 7.

In this way, the degree of attenuation is different between when the distance measured object 7 is concrete and when it is a metal. Furthermore, as the distance between the distance measured object 7 and the ultrasonic-wave sensor becomes longer, the signal level of the reflected ultrasonic wave propagated in the air becomes lower. When the level of the reflected ultrasonic wave becomes low, the level of the signal detected by the detection circuit 118 does not reach the predetermined level, so the reflected ultrasonic wave can not be received by the distance measurement calculation control circuit 122. Therefore, a sensitivity correction is carried out in the distance measurement sensitivity correction circuit 114.

Figure 6:
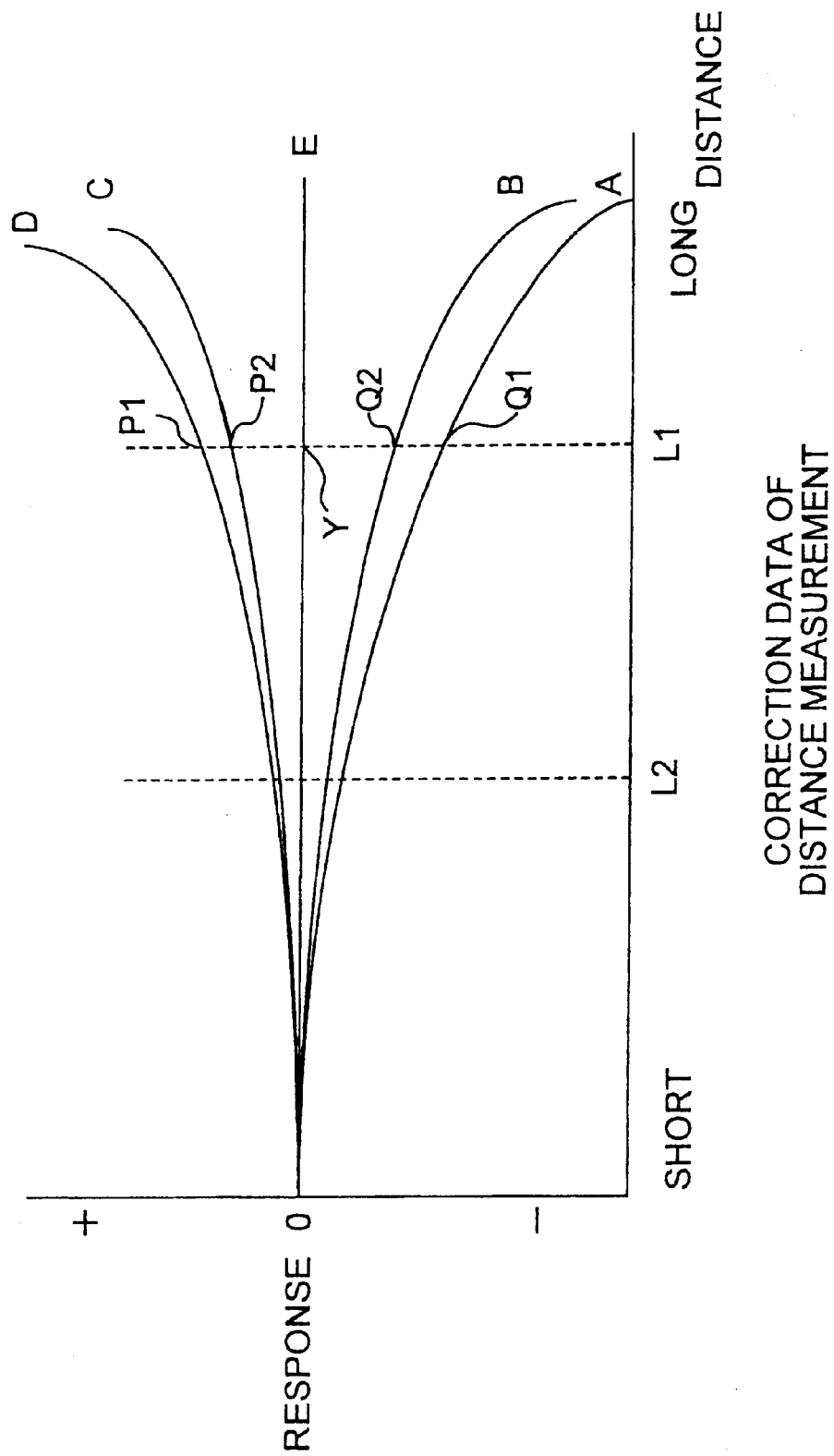
FIG. 6 is a view of correction curves for correction processing in the distance measurement calculation control circuit shown in FIG. 4.

Step 11:

The ultrasonic-wave sensor sensitivity correction data shown in FIG. 6, that is, the correction data indicated by the curves C and D, is generated from the ultrasonic-wave attenuation characteristics prepared in step 10.

In FIG. 6, the horizontal line E extending from the origin 0 to the right is a line indicating the attenuation characteristics when using a material, such as a mirror, exhibiting complete reflection of an ultrasonic wave. This line is shown as if there is no attenuation, however, it shows a reference for the attenuation characteristics when the distance measured object 7 is a metal, concrete, and so forth.

The curve A in FIG. 6 indicates a relative attenuation characteristic to the reference attenuation characteristic of a distance measured object 7 of a mirror when the distance between the ultrasonic-wave sensor and the distance measured object 7 is a predetermined distance and the distance measured object 7 is concrete. For example, at the distance L1, the amount of Y-Q1 is attenuated when the distance measured object 7 is concrete comparing with when the distance measured object 7 is a mirror.

The curve B in FIG. 6 indicates a relative attenuation characteristic to the reference attenuation characteristic of the distance measured object 7 of a mirror when the distance between the ultrasonic-wave sensor and the distance measured object 7 is a predetermined distance and the distance measured object 7 is a metal. For example, at the distance L1, the amount of Y-Q2 is attenuated when the distance measured object 7 is a metal comparing with when the distance measured object 7 is a mirror.

The curves C and D in FIG. 6 indicate ultrasonic-wave sensor sensitivity correction data corresponding to the attenuation curves A and B.

The curve C is symmetric with respect to a line O-E with the curve B and indicates data of sensitivity correction in the distance measurement sensitivity correction circuit 114 for exactly the amount of Y-P2 which is equivalent to the relative attenuation amount Y-Q2.

The curve D is symmetric with respect to the line O-E with the curve B and indicates data of sensitivity correction in the distance measurement sensitivity correction circuit 114 for exactly the amount of Y-P1 which is equivalent to the relative attenuation amount Y-Q1.

The distance measurement sensitivity correction circuit 114 corrects the signal received by the ultrasonic-wave reception sensor 13 in accordance with the ultrasonic-wave sensor sensitivity correction data based on the curves C and D.

The larger the attenuation due to the reflection, the larger the amount of correction in the distance measurement sensitivity correction circuit 114.

As the method of correction by the ultrasonic-wave sensor sensitivity correction data in the distance measurement sensitivity correction circuit 114, the distance measurement sensitivity correction circuit 114 is configured by a variable gain amplitude circuit and the gain is varied based on the ultrasonic-wave sensor sensitivity correction data from the distance measurement calculation control circuit 122.

Step 12:

The generated ultrasonic-wave sensor sensitivity correction data is stored in the memory 1222 in the distance measurement calculation control circuit 122.

It is not necessary to carry out the processing indicated in step 1 to step 10 for each of the ultrasonic-wave distance measuring apparatuses of the separate transmission and reception type reflection system. If the processing is carried out once, the ultrasonic-wave sensor sensitivity correction data obtained from the processing can be applied to a plurality of ultrasonic-wave distance measuring apparatuses of the separate transmission and reception type reflection system. Therefore, it is sufficient to store the ultrasonic-wave sensor sensitivity correction data obtained in the above way in the memories 1222 of the respective ultrasonic-wave distance measuring apparatuses of the separate transmission and reception type reflection system.

The method of storing the ultrasonic-wave sensor sensitivity correction data in the memory 1222 in the distance measurement calculation control circuit 122 in a ultrasonic-wave distance measuring apparatus is to store the break points of data indicated by the curves C and D shown in FIG. 6 as an example in the memory 1222. Then, at the time of use as the ultrasonic-wave sensor sensitivity correction data, the data of the break points is interpolated, which will be described later on.

Below, the operation of the ultrasonic-wave receiver 11, especially the operations of the distance measurement calculation control circuit 122 and the distance measurement sensitivity correction circuit 114, will be described in detail with reference to the flow chart shown in FIG. 7.

Figure 7:
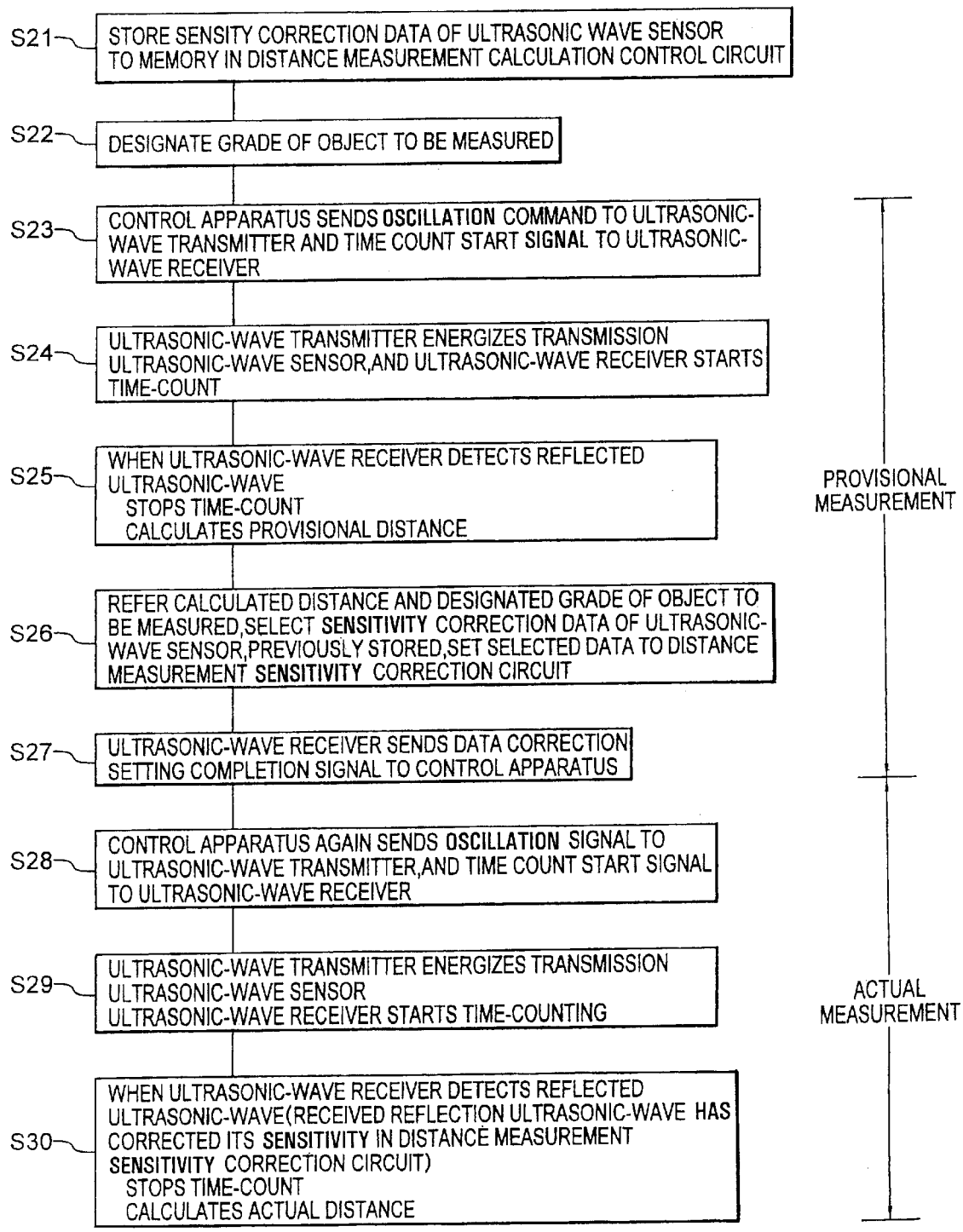
FIG. 7 is a flow chart of the processing of the ultrasonic-wave receiver 11 shown in FIG. 4, especially the distance measurement calculation control circuit 122 shown in FIG. 4.

FIG. 7 is a flow chart mainly showing the operation of the central processing unit (CPU) 1220 of the distance measurement calculation control circuit 122.

Step 21:

As explained above, the ultrasonic-wave sensor sensitivity correction data is stored in the memory 1222 in the distance measurement calculation control circuit 122.

The method of storing the ultrasonic-wave sensor sensitivity correction data in the memory 1222 in the distance measurement calculation control circuit 122 is to store the break points in the memory 1222 and interpolate the data of the break points for use as the ultrasonic-wave sensor sensitivity correction data.

Step 22:

The type setting apparatus 124 sets the type of the distance measured object 7. The distance measured object 7 is, when a vehicle is driving on the road, assumed to be metal, that is, part of another vehicle's body. The distance measured object 7 is assumed to be concrete when the vehicle is being parked in a garage. Further, when driving through a crowded road, the distance measured object 7 is set to be a human body.

Note that the distance measurement sensitivity correction circuit 114 in its initial state is in a non-correcting state because the ultrasonic-wave sensor sensitivity correction data is not set.

Step 23:

The control apparatus 21 outputs an ultrasonic-wave vibration signal to the ultrasonic-wave transmitter 1 and outputs a timing start signal to the ultrasonic-wave receiver 11.

Step 24:

The ultrasonic-wave transmitter 1 excites the ultrasonic-wave transmission sensor 3. Simultaneously, the time counting unit 1224 of the distance measurement calculation control circuit 122 in the ultrasonic-wave receiver 11 starts to count.

Step 25:

When the ultrasonic-wave reception sensor 13 receives the reflected ultrasonic wave, the received wave is amplified by the pre-stage amplification circuit/buffer circuit 110. Then only the high frequency component thereof is passed through the high frequency signal filtering circuit 112 and passes through the distance measurement sensitivity correction circuit 114. Only the low frequency component thereof is passed through the low frequency signal filtering circuit/buffer circuit 116 and the envelope detection wave is detected in the detection circuit 118. The signal after envelope detection in the detection circuit 118 is continuously stored in the buffer circuit 120 and input to the distance measurement calculation control circuit 122.

The distance measurement calculation control circuit 122 continuously reads the detection signal stored in the buffer circuit 120 and judges whether or not it exceeds a predetermined level. When the level of the signal read from the buffer circuit 120 exceeds it for, for example, three times in a row, the distance measurement calculation control circuit 122 judges that the ultrasonic-wave reception sensor 13 received the reflected ultrasonic wave from the distance measured object 7.

At this time, the distance measurement calculation control circuit 122 stops the time counting. As a result, the time from the start of vibration of the ultrasonic-wave transmission sensor 3 to the reception by the ultrasonic-wave reception sensor 13 can be measured. Calculation of a provisional distance is carried out in the distance measurement calculation control circuit 122 by using the obtained time based on equation 1.

Note that the distance calculation by equation 1 is performed by calculating the actual ultrasonic-wave propagation velocity V using the obtained temperature by the temperature sensor 126.

Step 26:

The distance measurement calculation control circuit 122 generates the ultrasonic-wave sensor sensitivity correction data corresponding to the calculated provisional distance and the type of the distance measured object 7 set by the type setting device 124 from the ultrasonic-wave sensor sensitivity correction data stored in the memory 1222. The processing of the above step 25 and step 26 in the distance measurement calculation control circuit 122 is explained further specifically with reference to the configuration shown in FIG. 4.

The CPU 1220 stops the counting processing of the time counting unit 1224 when the detection signal of the detection circuit 118 read from the buffer circuit 120 exceeds a predetermined level. As a result, the time S from the start of vibration of the ultrasonic-wave transmission sensor 3 to the reception of the reflected ultrasonic wave from the distance measured object 7 by the ultrasonic-wave reception sensor 13 can be measured. The CPU 1220 calculates the distance measured based on equation 1. The CPU 1220 reads the result of the temperature measurement and calculates the distance based on equation 1 in the state with the ultrasonic-wave propagation velocity V corrected for the temperature.

The CPU 1220, in response to the calculated distance Lm and the type of the distance measured object 7 set in the type setting device 124, reads the ultrasonic-wave sensor sensitivity correction data stored in the memory 1222, interpolates the same in accordance with need, generates the ultrasonic-wave sensor sensitivity correction data at the calculated distance Lm, and sets the same to the distance measurement sensitivity correction circuit 114.

Step 27:

The CPU 1220 in the distance measurement calculation control circuit 122 transmits a signal indicating completion of measurement the provisional distance to the control apparatus 21.

Step 28:

The control apparatus 21 transmits a signal to start exciting the ultrasonic-wave transmission sensor 3 to the ultrasonic-wave transmitter 1 again and transmits a counting start signal to the ultrasonic-wave receiver 11.

Step 29:

In the same way as in step 24, the operation of exciting the ultrasonic-wave transmission sensor 3 in the ultrasonic-wave transmitter 1 and the operation of starting counting by the time counting unit 1224 in the distance measurement calculation control circuit 122 start.

Step 30:

When the ultrasonic-wave reception sensor 13 receives the reflected ultrasonic wave, the received wave is amplified in the pre-stage amplification circuit/buffer circuit 110. Then, only the high frequency component thereof is passed through the high frequency signal filtering circuit 112 and passes through the distance measurement sensitivity correction circuit 114. Only the low frequency component thereof is passed through the low frequency signal filtering circuit/buffer circuit 116 and the envelope detection wave is detected in the detection circuit 118. Note that, at this point, the distance measurement sensitivity correction circuit 114 corrects the signal from the high frequency signal filtering circuit 112 by the ultrasonic-wave sensor sensitivity correction data set by the CPU 1220.

The signal subjected to envelope detection in the detection circuit 118 is stored in the buffer circuit 120 and input to the distance measurement calculation control circuit 122.

The CPU 1220 stops the counting processing of the time counting unit 1224 when the detection signal of the detection circuit stored continuously in the buffer circuit 120 exceeds a predetermined level. Note that the method of judging whether or not the detection signal of the detection circuit 118 exceeds the predetermined level is, as a countermeasure to noise, to regard that a proper reflected ultrasonic wave is received when the detection signal exceeds the predetermined level twice in a row. The level of judgement in this case is preferably higher than the level in step 25 in consideration of the fact that the sensitivity correction is carried out in the distance measurement sensitivity correction circuit 114. Of course, it may be the same level as in step 25.

As a result, the ultrasonic-wave transmission sensor 3 starts the vibrating and the time S when the ultrasonic-wave reception sensor 13 receives the reflected ultrasonic wave from the distance measured object 7 can be measured.

The CPU 1220 calculates the measured distance based on equation 1. Note that the CPU 1220 reads the result of the temperature taken at this time and carries out the final distance calculation Lf based on equation 1 in the state with the ultrasonic-wave propagation velocity V corrected for temperature.

The distance Lf calculated in this way is the precise distance between the ultrasonic-wave sensor and the distance measured object 7 corrected by the ultrasonic-wave sensor sensitivity correction data shown in FIG. 6.

According to experiments, when using water-proof type ultrasonic-wave sensors for the ultrasonic-wave transmission sensor 3 and the ultrasonic-wave reception sensor 13, the precisely and stably measurable distance between the ultrasonic-wave sensor and the distance measured object 7 can be extended from the 4 to 5 meters in the related art to 12 to 15 meters based on the present embodiment. Namely, by correcting the sensitivity of the water-proof type ultrasonic-wave sensors by using the ultrasonic-wave sensor sensitivity correction data in the distance measurement sensitivity correction circuit 114, the measurable distance is extended.

Accordingly, when the ultrasonic-wave distance measuring apparatus of the separate transmission and reception type reflection system of the present embodiment is applied, for example, to a vehicle, while originally applied for the main purpose of preventing collision with the garage wall when parking, the apparatus can be applied to a variety of purposes in addition to that.

For example, the ultrasonic-wave distance measuring apparatus of the separate transmission and reception type reflection system of the present embodiment can be applied to measure the distance to vehicles in front and behind of the installed vehicle when driving on the road. For example, it is possible to detect the proximity to the vehicle in front or a vehicle behind on the road, for example, it can detect if the vehicle is approaching within 10 meters. Accordingly, if an alarm is output at this time, it is possible to warn the driver. As warnings to drivers, an alarm notifying proximity to the driver using the ultrasonic-wave distance measuring apparatus of the separate transmission and reception type reflection system and an alarm to notify a too close approach to the driver of the vehicle behind it when the vehicle behind approaches too close can be considered.

Second Embodiment

An ultrasonic-wave distance measuring apparatus and method of the separate transmission and reception type reflection system according to a second embodiment of the present invention will be described with reference to FIG. 8.

Figure 8:
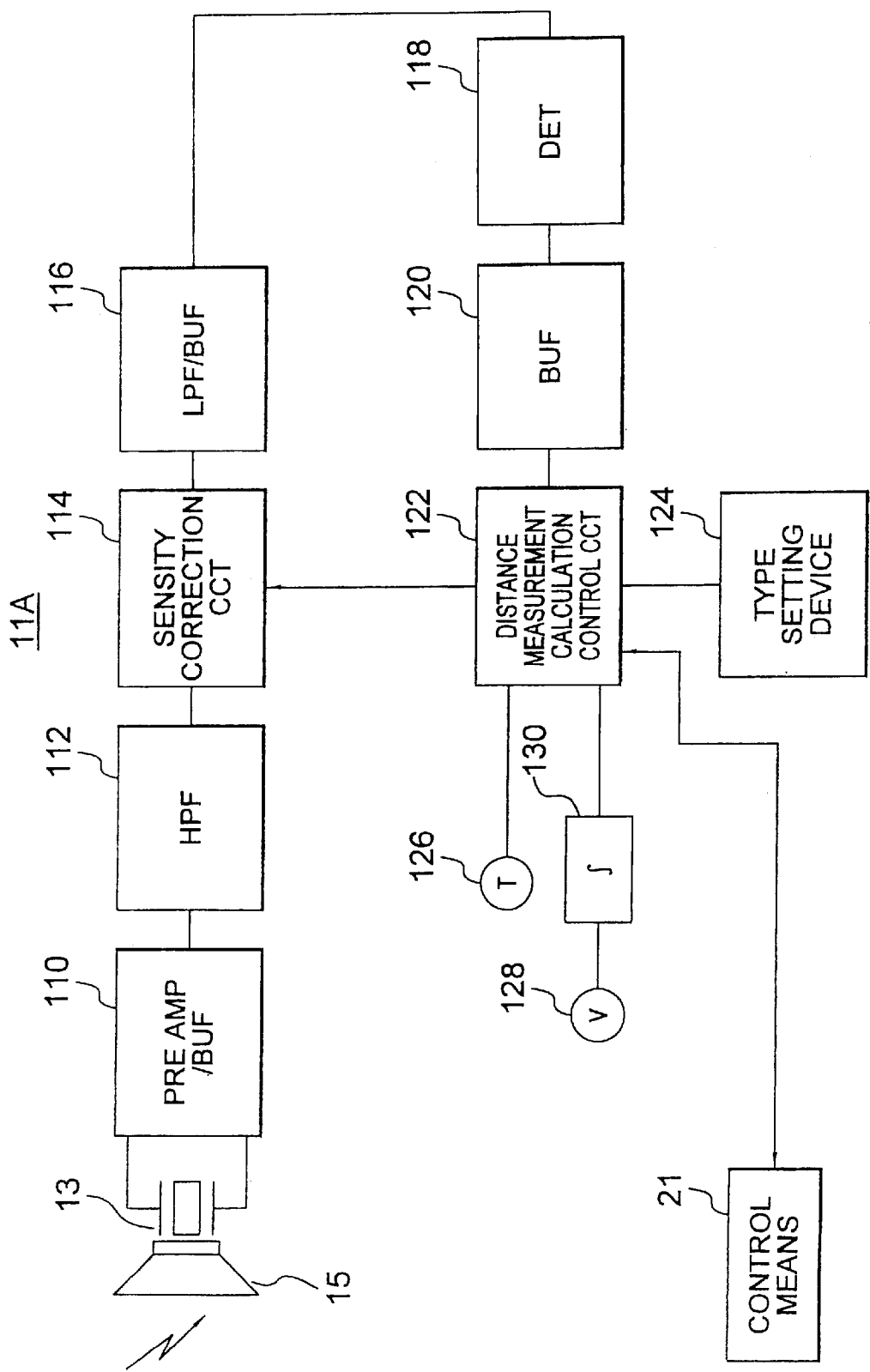
FIG. 8 is a view of the configuration of a receiver of an ultrasonic-wave distance measuring apparatus of a separate transmission and reception type reflection system according to a second embodiment of the present invention.

FIG. 8 is a view of the configuration of an ultrasonic-wave distance measuring apparatus of the separate transmission and reception type reflection system of the second embodiment of the present invention.

The ultrasonic-wave receiver 11A shown in FIG. 8 illustrates the usage of the ultrasonic-wave distance measuring apparatus of the separate transmission and reception type reflection system installed in a vehicle and consists of the ultrasonic-wave receiver 11 shown in FIG. 3 connected to a vehicle speed sensor 128 and a vehicle speed signal averaging circuit 130.

The vehicle speed sensor 128 is a speed sensor which detects the speed of the vehicle. The vehicle speed signal averaging circuit 130 integrates the speed momentary read by the speed sensor with a predetermined time to calculates the average vehicle speed of the predetermined time. Note that the reason why the vehicle speed signal averaging circuit 130 is used is to prevent an erroneous judgement caused by using the momentary vehicle speed data from the vehicle sensor 128, which will be explained later on.

When driving at a high speed, the sound generated by the wind becomes high. Or, if the surface of the road is very bumpy, the vehicle jolts heavily. When the ultrasonic-wave reception sensor 13 senses and responds to a jolt, the same phenomenon happens as if the ultrasonic-wave reception sensor 13 receives a reflected ultrasonic-wave from a near distance measured object 7 despite that the distance between the ultrasonic-wave reception sensor 13 and the distance measured object 7 being very long.

Therefore, the CPU 1220 of the distance measurement calculation control circuit 122 receives as an input the average vehicle speed from the vehicle speed signal averaging circuit 130 and stops the operation of the above control apparatus 21, the ultrasonic-wave transmitter 1, and the ultrasonic-wave receiver 11A when the average vehicle speed exceeds a predetermined range. As a result, the above erroneous operation while driving a vehicle can be prevented.

Note that also when the vehicle speed is not within the above range, the ultrasonic-wave distance measuring apparatus of the separate transmission and reception type reflection system can be manually placed into operation by a not illustrated mode switch.

Third Embodiment

When installing the ultrasonic-wave distance measuring apparatus of the separate transmission and reception type reflection system shown in FIG. 8 in a vehicle, especially in the case of preventing the rear portion of the vehicle from colliding with the wall of the garage when parking the vehicle in a garage, unlike the second embodiment, the sensitivity correction by the above ultrasonic-wave sensor sensitivity correction data is performed to calculate the distance from the ultrasonic-wave reception sensor 13 to the distance measured object 7 when the average speed from the vehicle speed signal averaging circuit 130 becomes below a predetermined level.

If the distance measurement is performed by performing the sensitivity correction in the distance measurement sensitivity correction circuit 114 and detection in the detection circuit 118 and judging that the ultrasonic-wave reception sensor 13 has properly received the reflected ultrasonic-wave when the detection signal exceeds a predetermined level a plurality of times in the distance measurement calculation control circuit 122, that is, the reliability is high, the distance between the ultrasonic-wave reception sensor 13 and the distance measured object 7 (the wall of the garage) can be precisely detected. As a result, the rear portion of the vehicle can be easily backed up right up to the garage wall.

Fourth Embodiment

An ultrasonic-wave distance measuring apparatus and method of the separate transmission and reception type reflection system according to a fourth embodiment of the present invention will be explained with reference to FIG. 9.

FIG. 9 is a view of the configuration of an ultrasonic-wave distance measuring apparatus of the separate transmission and reception type reflection system of the fourth embodiment of the present invention.

The ultrasonic-wave distance measuring apparatus of the separate transmission and reception type reflection system shown in FIG. 9 comprises the ultrasonic-wave distance measuring apparatus of the separate transmission and reception type reflection system shown in FIG. 8 plus a transmission power control circuit 140.

Also, as an example of the type setting apparatus 124, a configuration using a key switch 1240 is shown. The key switch 1240 can set the type of the distance measured object 7 by defining it by a point of intersection of a crosswise P line and a vertical K line.

The transmission power control circuit 140 is a circuit to control the voltage applies to the ultrasonic-wave transmission sensor 3 in the ultrasonic-wave transmitter 1 in accordance with the control signal from the distance measurement calculation control circuit 122.

Note that the transmission power control circuit 140 can be configured as an internal circuit of the ultrasonic-wave transmitter 1, however, in the present embodiment, a configuration providing the transmission power control circuit 140 on the ultrasonic-wave receiver 11 side separate from the ultrasonic-wave transmitter 1, as shown in FIG. 9, will be described.

Instructions to the transmission power control circuit 140, which will be described below, can be sent to the transmission power control circuit 140 via the control apparatus 21 especially when the transmission power control circuit 140 is provided inside the ultrasonic-wave transmitter 1, in addition to sending it to the transmission power control circuit 140 directly from the distance measurement calculation control circuit 122. However, in the present embodiment, a case of sending instructions to the transmission power control circuit 140 directly from the distance measurement calculation control circuit 122 will be described.

An appropriate voltage for application to the ultrasonic-wave transmission sensor 3 for the reflected ultrasonic-wave characteristics in accordance with the distance and the type of the distance measured object 7 is stored in the memory 1222 of the distance measurement calculation control circuit 122 in advance.

When a provisional distance is calculated in the distance measurement calculation control circuit 122, an approximate distance between the distance measured object 7 and the ultrasonic-wave reception sensor 13 is obtained. In accordance with the distance and the type of the distance measured object 7 specified by the key switch 1240, the distance measurement calculation control circuit 122 reads the voltage stored in the memory 1222 and outputs the same to the transmission power control circuit 140.

The transmission power control circuit 140 outputs the designated voltage to the ultrasonic-wave transmitter 1 and the ultrasonic-wave transmitter 1 excites the ultrasonic-wave transmission sensor 3 with that voltage.

The distance measurement can be made further precise by selecting the voltage to the ultrasonic-wave transmission sensor 3 in accordance with the type of the distance measured object 7.

Especially, in short distance measurement, the voltage to excite the ultrasonic-wave transmission sensor 3 can be lowered, so that the vibration of the ultrasonic-wave transmission sensor 3 becomes weaker. As a result, erroneous detection by the ultrasonic-wave reception sensor 13 caused by the vibration of the ultrasonic-wave transmission sensor 3 can be eliminated. Furthermore, countermeasures to the vibration becomes unnecessary.

Note that, in short distance measurement, the sensitivity correction in the distance measurement sensitivity correction circuit 114 is correction that largely attenuates the input signal. As a result, the noise due to large sounds, vibration, etc. can be electrically eliminated without controlling the voltage applied to the ultrasonic-wave transmission sensor 3 by using the transmission power control circuit 140.

Fifth Embodiment

An ultrasonic-wave distance measuring apparatus and method of the separate transmission and reception type reflection system according to a fifth embodiment of the present invention will be explained with reference to FIG. 10.

FIG. 10 is a view of the configuration of an ultrasonic-wave distance measuring apparatus of the separate transmission and reception type reflection system according to a fifth embodiment of the present invention.

The ultrasonic-wave distance measuring apparatus of the separate transmission and reception type reflection system shown in FIG. 10 has a simple configuration comprised of the ultrasonic-wave distance measuring apparatus of the wherein the key switch 1240, the temperature separate transmission and reception type reflection system shown in FIG. 9 minus the sensor 126, the vehicle speed sensor 128, the vehicle speed signal averaging circuit 130, and the transmission power control circuit 140.

Namely, a specific type of the distance measured object 7 is assumed in the fifth embodiment, so that the selection by the key switch 1240 is unnecessary. For example, when the ultrasonic-wave distance measuring apparatus of the separate transmission and reception type reflection system is installed in a vehicle for measuring a distance between the vehicle and the one in front or behind, the distance measured object 7 can be specified to be a vehicle. Therefore, the complex set-up by the key switch 1240 is removed.

Also, the average operation temperature of the ultrasonic-wave distance measuring apparatus of the separate transmission and reception type reflection system is assumed to be, for example, 20° C., and the fixed value at 20° C. is used for the ultrasonic-wave propagation velocity. As a result, the temperature sensor 126 is removed.

Furthermore, by assuming that the ultrasonic-wave distance measuring apparatus of the separate transmission and reception type reflection system is used when driving the vehicle within a predetermined conditions, the vehicle speed sensor 128 and the vehicle speed signal averaging circuit 130 are removed. Especially when the vehicle is driving in a high speed condition, for example, even if the ultrasonic-wave reception sensor 13 erroneously operates in response to sound due to the wind, the distance measurement result is not output when such an erroneous operation is momentary in the distance measurement calculation control circuit 122, and the distance calculation result is output only when the distance specifying results of the previous time and the present time are similar. Namely, the distance measurement calculation control circuit 122 prevents the erroneous operation of the ultrasonic-wave reception sensor 13 through signal processing.

By the above, the configuration of the ultrasonic-wave distance measuring apparatus of the separate transmission and reception type reflection system becomes simpler.

The ultrasonic-wave distance measuring apparatus and method of the separate transmission and reception type reflection system of the present invention are not limited to the above embodiments. A variety of modifications can be made.

For example, the ultrasonic-wave transmission sensor 3 and the ultrasonic-wave reception sensor 13 are not limited to the above explained ultrasonic-wave sensors of a piezoelectric ceramic type, more specifically, ultrasonic-wave sensors of a piezoelectric ceramic type of lithium niobate. A variety of ultrasonic-wave sensors can be used.

The above configuration and the operation of the control apparatus 21, the ultrasonic-wave transmitter 1, and the ultrasonic-wave receivers 11 and 11A and the configuration and the operation of the distance measurement calculation control circuit 122 are examples. The configuration and the operation of the present invention are not limited by the above examples. For example, the configuration of the ultrasonic-wave receiver 11 shown in FIG. 3 and the configuration and the functions of the distance measurement calculation control circuit 122 shown in FIG. 4 are examples.

Further, while the ultrasonic-wave distance measuring apparatus and method of the separate transmission and reception type reflection system of the present invention were explained especially with reference to an example of improvement when using water-proof type ultrasonic-wave sensors as the ultrasonic-wave transmission sensor 3 and the ultrasonic-wave reception sensor 13, the present invention is not limited to the case of using water-proof type ultrasonic-wave sensors. The above advantageous effects can be achieved even when using ordinary ultrasonic-wave sensors.

In the above embodiments, as explained as an example with reference to FIG. 7, a case of measuring a distance by performing the provisional distance measurement (calculation of a provisional distance, steps 23 to 27 in FIG. 7) and the actual distance measurement after that (steps 28 to 30 in FIG. 7) only once was explained as an example. However, if more precise distance measurement is demanded when the relative driving speed of the vehicle having the ultrasonic-wave distance measuring apparatus of the separate transmission and reception type reflection system of the present invention and the distance measured object 7 is slow, it is possible to obtain the average value of the actual distance measurement values by performing the above calculation of the provisional distance and the calculation of the actual distance a plurality of times.

Also, in the same way as above, for example, when the driving speed of the vehicle is slow, it is possible to calculate the actual distance by measuring the actual distance along with carrying out the sensitivity correction from the short distance to the long distance (or in the inverse direction) and by using the value when the amplitude of the ultrasonic-wave sensor 15 after the sensitivity correction indicates the maximum amplitude.

Summarizing again the effects of the invention, according to the present invention, by properly performing the sensitivity correction of the ultrasonic-wave sensor, the measurable distance by the ultrasonic-wave distance measuring apparatus of the separate transmission and reception type reflection system can be made longer even in the case of using water-proof type ultrasonic-wave sensors.

According to the present invention, further, since sensitivity correction is performed in accordance with the type of the distance measured object or the distance, the distance measurement becomes reliable and stable.

According to the present invention, further, there is less influence of the vibration of the ultrasonic-wave transmission sensor, therefore countermeasures to the vibration become unnecessary. Also, enlargement of the apparatus can be prevented.

When applying the ultrasonic-wave distance measuring apparatus of the separate transmission and reception type reflection system of the present invention to a vehicle, distance measurement by erroneous operation can be prevented by judging the value of the vehicle speed from the vehicle speed sensor.

Note that the present invention is not limited to the above embodiments and includes modifications within the scope of the claims.

What is claimed is:

1. An ultrasonic-wave distance measurement method of a separate transmission and reception type reflection system which receives an ultrasonic wave emitted from an ultrasonic-wave transmission sensor and reflected at a distance measured object by an ultrasonic-wave reception sensor, measures a time from the transmission of the ultrasonic wave to the reception of the same, and performs sensitivity correction in accordance with a type of the distance measured when measuring the distance between the ultrasonic-wave transmission sensor or the ultrasonic-wave reception sensor and the distance measured object from the obtained time, said method including the following steps of:

measuring a time from the transmission of an ultrasonic wave emitted from the ultrasonic-wave transmission sensor to the distance measured object to the reception of the same, calculating a provisional distance from the measured time, measuring attenuation characteristics of the reflected ultrasonic-wave by comparing an amplitude with a reference reflection ultrasonic-wave, and preparing ultrasonic-wave sensor sensitivity correction data from the attenuation characteristics with respect to every type of distance measured object and various distances between the distance measured object and the ultrasonic-wave transmission sensor or the ultrasonic-wave reception sensor;

setting a type of the distance measured object prior to an actual distance measured;

starting counting simultaneously with the emission of an ultrasonic-wave signal to the distance measured object by driving the ultrasonic-wave reception sensor, stopping the counting simultaneous with the reception of the reflected wave by the ultrasonic-wave reception sensor, measuring an elapsed time from the driving of the ultrasonic-wave transmission sensor to the reception of the reflected wave by the ultrasonic-wave reception sensor, calculating a provisional distance between the ultrasonic-wave transmission sensor or the ultrasonic-wave reception sensor and the distance measured object based on the elapsed time, generating ultrasonic-wave sensor sensitivity correction data for reception corresponding to the calculated provisional distance and the set type of the distance measured object, and enabling sensitivity correction related to the sensor sensitivity correction data in an ultrasonic-wave signal sensitivity correction portion for reception;

starting counting a time simultaneously with the emission of the ultrasonic-wave signal to the distance measured object by driving the ultrasonic-wave transmission sensor again; and stopping the counting simultaneously with the reception of a reflected wave larger than a predetermined level by the ultrasonic-wave reception sensor again, measuring a time from the driving of the reflected wave by the ultrasonic-wave transmission sensor to the reception of the reflected wave by the ultrasonic-wave reception sensor, and calculating the actual distance between the ultrasonic-wave transmission sensor or the ultrasonic-wave reception sensor and the distance measured object based on the measured time.

2. An ultrasonic-wave distance measurement method of a separate transmission and reception type reflection system as set forth in claim 1, wherein, when the ultrasonic-wave transmission sensor and the ultrasonic-wave reception sensor are installed in an apparatus and when the apparatus and the distance measured object are relatively movable, including the steps of:

measuring a relative speed between the apparatus and the distance measured object and calculating the distance measurement only when the measured speed is within a predetermined range.

3. An ultrasonic-wave distance measurement method of a separate transmission and reception type reflection system as set forth in claim 2, wherein:

the ultrasonic-wave transmission sensor is a water-proof type ultrasonic-wave transmission sensor; and the ultrasonic-wave reception sensor is a water-proof type ultrasonic-wave reception sensor.

4. An ultrasonic-wave distance measurement method of a separate transmission and reception type reflection system which receives an ultrasonic wave emitted from an ultrasonic-wave transmission sensor and reflected at a distance measured object by an ultrasonic-wave reception sensor, measures a time from the transmission of the ultrasonic wave to the reception of the same, and performs sensitivity correction in accordance with a distance to a specific distance measured object when measuring the distance between the ultrasonic-wave transmission and the distance measured object from the obtained time, said method including the following steps of:

measuring an elapsed time from transmission when an ultrasonic wave is emitted from the ultrasonic-wave transmission sensor to the distance measured object to reception of the same, calculating a provisional distance from the obtained time, measuring attenuation characteristics of the reflected ultrasonic wave by comparing an amplitude with a reference reflection ultrasonic wave, and preparing ultrasonic-wave sensor sensitivity correction data from the attenuation characteristics with respect to a specific type of the distance measured object and the ultrasonic-wave transmission sensor or the ultrasonic-wave reception sensor;

starting counting a time simultaneously with the emission of an ultrasonic-wave signal to the distance measured object by driving the ultrasonic-wave transmission sensor;

stopping the counting simultaneously with the reception of the reflected wave by the ultrasonic-wave reception sensor, measuring an elapsed time from the driving of the ultrasonic-wave transmission sensor to the reception of the reflected wave by the ultrasonic-wave reception sensor, calculating a provisional distance between the ultrasonic-wave transmission sensor or the ultrasonic-wave reception sensor and the distance measured object based on the elapsed time, generating the ultrasonic-wave sensor sensitivity correction data for reception corresponding to the calculated provisional distance, and enabling the sensitivity correction based on said sensor sensitivity correction data in an ultrasonic-wave signal sensitivity correction portion for reception;

starting counting a time simultaneously with the emission of the ultrasonic-wave signal to the distance measured object by driving the ultrasonic-wave transmission sensor again; and stopping the counting simultaneously with the reception of the reflected wave by the ultrasonic-wave reception sensor again, measuring a time from the driving of the ultrasonic-wave transmission sensor to the reception of the reflected wave by the ultrasonic-wave reception sensor, and calculating an actual distance between the ultrasonic-wave transmission sensor or the ultra-sonic wave reception sensor and the distance measured object based on the obtained time.

5. An ultrasonic-wave distance measurement method of a separate transmission and reception type reflection system as set forth in claim 4, wherein when the ultrasonic-wave transmission sensor and the ultrasonic-wave reception sensor are installed in an apparatus and when the apparatus and the distance measured object are relatively movable, including the following steps of:

measuring the relative speed of the apparatus and the distance measured object and calculating the distance measurement only when the measured speed is within a predetermined range.

6. A ultrasonic-wave distance measurement method of a separate transmission and reception type reflection system as set forth in claim 5, wherein:

the ultrasonic-wave transmission sensor is a water-proof type ultrasonic-wave transmission sensor; and the ultrasonic-wave reception sensor is a water-proof type ultrasonic-wave reception sensor.

7. An ultrasonic-wave distance measuring apparatus of a separate transmission and reception type reflection system which receives an ultrasonic wave emitted from an ultrasonic-wave transmission sensor and reflected at a distance measured object by an ultrasonic-wave reception sensor, measures a time from the transmission sensor of the ultrasonic wave to the reception of the same, and measures a distance between the ultrasonic-wave transmission sensor or the ultrasonic-wave reception sensor and the distance measured object from the obtained time, said apparatus comprising:

a transmitter for performing drive control of the ultrasonic-wave transmission sensor;

a receiver for performing distance measurement by processing a signal from the ultrasonic-wave reception sensor; and a control means for controlling the transmitter and the receiver;

said receiver comprising:

a type setting device for setting a type of the distance measured object;

a sensitivity correction circuit for correcting a sensitivity of the received signal in the ultrasonic-wave reception sensor;

a detection circuit for detecting an output of the sensitivity correction circuit; and a distance measurement calculation control means;

said distance measurement calculation control means storing in advance sensitivity correction data of the ultrasonic-wave reception sensor obtained by measuring a received wave by the ultrasonic-wave reception sensor when an ultrasonic-wave is emitted to the distance measured object by the ultrasonic-wave transmission sensor and generating the sensitivity correction data of the ultrasonic-wave reception sensor from the measured data with respect to each type of the distance measured object and various distances between the distance measured object and the ultrasonic-wave transmission or the ultrasonic-wave reception sensor;

the control means making the transmitter perform a first ultrasonic-wave transmission operation from the ultrasonic-wave transmission sensor and the receiver to start counting a time simultaneously;

the distance measurement calculation control means of the receiver;

measuring a time from the first driving of the ultrasonic-wave transmission sensor by the transmitter to the reception of the reflected ultrasonic-wave by the ultrasonic-wave reception sensor;

measuring a provisional distance between the ultrasonic-wave transmission sensor or the ultrasonic-wave reception sensor and the distance measured object; and generating ultrasonic-wave sensor sensitivity correction data corresponding to the calculated provisional distance and a type of the distance measured object set by the type setting device, setting the sensor sensitivity correction data to the ultrasonic signal sensitivity correction circuit for reception, and implementing the completion of setting the ultrasonic-wave sensor sensitivity correction data to the control apparatus;

the control means, in response to the completion of the processing of the distance measurement calculation control circuit, making the transmitter perform a second ultrasonic-wave transmission operation and the receiver start counting simultaneously; and the distance measurement calculation control means of the receiver;

measuring an elapsed time from the second driving of the ultrasonic-wave transmission sensor in the transmitter to the detection of reception of the reflected ultrasonic-wave and calculating the actual distance between the ultrasonic-wave transmission sensor or the ultrasonic-wave reception sensor and the distance measured object by using the elapsed time.

8. An ultrasonic-wave distance measuring apparatus of the separate transmission and reception type reflection system as set forth in claim 7, wherein when the ultrasonic-wave transmission sensor and the ultrasonic-wave reception sensor are installed in an apparatus and the apparatus and the distance measured object are relatively movable;

further comprising a speed measurement means for measuring the relative speed of the apparatus and the distance measured object and the distance measurement calculation control means performing the distance measurement processing only when the measured speed by the speed measurement means is within a predetermined range.

9. An ultrasonic-wave distance measuring apparatus of the separate transmission and reception type reflection system as set forth in claim 8, wherein the ultrasonic-wave transmission sensor is a water-proof type ultrasonic-wave transmission sensor; and the ultrasonic-wave reception sensor is a water-proof type ultrasonic-wave sensor.

10. An ultrasonic-wave distance measuring apparatus of the separate transmission and reception type reflection system as set forth in claim 9, wherein:

said distance measurement calculation control means comprises:

a storing means for storing sensitivity correction data of the ultrasonic-wave reception sensor obtained by measuring a received wave by the ultrasonic-wave reception sensor when the ultrasonic-wave is emitted to the distance measured object by the ultrasonic-wave transmission sensor and measuring the sensitivity correction data of the ultrasonic-wave reception sensor from the measured data with respect to each type of the distance measured object and various distances between the distance measured object and the ultrasonic-wave transmission sensor or the ultrasonic-wave reception sensor;

a reflected ultrasonic-wave reception detection means for detecting the reception of the reflected ultrasonic wave by identifying a magnitude of the received signal received via the sensitivity correction circuit and the detection circuit by the ultrasonic-wave reception sensor;

a time counting means for measuring a time from the transmission of the ultrasonic wave to the distance measured object to the reception of the ultrasonic wave by starting counting based on an instruction from the control means and stopping timing when the reception is detected by the reflected ultrasonic-wave reception detection means;

a distance calculation means for calculating a distance from the obtained time; and a sensitivity correction data generation means for selecting the sensitivity correction data in the sensitivity correction circuit from the calculated distance and the type of the distance measured object;

the distance measurement calculation control means makes the transmitter perform the first ultrasonic-wave transmission operation from the ultrasonic-wave transmission sensor and instructs start of counting to the time counting means in the distance measurement calculation control means of the receiver simultaneously;

in said distance measurement calculation control means of the receiver:

the time counting means measures a time from the first driving of the ultrasonic-wave transmission sensor in the transmitter to the reception by the ultrasonic-wave reception sensor;

the distance measurement calculation control means measures a provisional distance between the ultrasonic-wave transmission sensor or the ultrasonic-wave reception sensor and the distance measured object by using the obtained time;

the sensitivity correction data generation means generates the ultrasonic-wave sensor sensitivity correction data corresponding to the calculated provisional distance and the type of the distance measured object set by the type setting device, sets the same to the ultrasonic-wave signal sensitivity correction circuit portion for reception, and instructs the control circuit of the completion of setting the ultrasonic-wave sensor sensitivity correction data;

the control means, in response to the completion of the processing of the distance measurement calculation control circuit, makes the transmitter perform the second ultrasonic-wave transmission operation and instructs the start of counting to the time counting means in the distance measurement calculation control means of the receiver simultaneously;

in the distance measurement calculation control circuit of the reception circuit:

the time counting means measures a time from the second driving of the ultrasonic-wave transmission sensor in the transmitter to when the reception is detected by the reflected ultrasonic-wave reception detection means and the distance calculation means calculates the actual distance between the ultrasonic-wave transmission sensor or the ultrasonic-wave reception sensor and the distance measured object by using the obtained time.

11. An ultrasonic-wave distance measuring apparatus of the separate transmission and reception type reflection system as set forth in claim 7, wherein:

the transmitter for performing the driving control of the ultrasonic-wave transmission sensor includes a transmission power control circuit capable of controlling a voltage applied to the ultrasonic-wave transmission sensor;

the distance measurement calculation control means in the receiver determines the voltage applied to the ultrasonic-wave transmission sensor in accordance with the result of the provisional distance calculation and outputs the determined value to the transmission power control circuit; and the ultrasonic-wave transmission sensor operates in response to the voltage determined by the distance measurement calculation control means at the second excitation.

* * * * *